US012780655B2

(12) United States Patent
Yun et al.

(10) Patent No.: US 12,780,655 B2
(45) Date of Patent: Nov. 3, 2026

(54) PROCESS FOR PRODUCING HYDROGEN, CARBON MONOXIDE, AND CARBON FROM METHANE-CONTAINING FEEDSTOCK

(71) Applicant: SK Innovation Co., Ltd., Seoul (KR)

(72) Inventors: Dong Min Yun, Daejeon (KR); Jung Geun Jang, Daejeon (KR); Ji Hoon Lee, Daejeon (KR); Ye Rhee Cha, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 551 days.

(21) Appl. No.: 18/468,852

(22) Filed: Sep. 18, 2023

(65) Prior Publication Data

US 2024/0124301 A1 Apr. 18, 2024

(30) Foreign Application Priority Data

Oct. 7, 2022 (KR) ........................ 10-2022-0128653
May 2, 2023 (KR) ........................ 10-2023-0056859

(51) Int. Cl.
*C01B 3/26* (2006.01)
*C01B 3/56* (2006.01)
(Continued)

(52) U.S. Cl.
CPC .................. *C01B 3/26* (2013.01); *C01B 3/56* (2013.01); *C01B 32/205* (2017.08); *C01B 32/40* (2017.08);
(Continued)

(58) Field of Classification Search
CPC ........... C01B 3/26; C01B 3/56; C01B 32/205; C01B 32/40; C01B 2203/0277; C01B 2203/1041; C01B 2203/1241; C01B 2203/1264; C01B 2203/148; C01B 2203/1623; C01B 2203/1638; C01B 2203/168; C01B 2203/04;
(Continued)

(56) References Cited

U.S. PATENT DOCUMENTS 3,940,118 A 2/1976 Heinemann et al.
10,179,326 B2 1/2019 Basset et al.
(Continued)

FOREIGN PATENT DOCUMENTS

AU 2014214982 A1 9/2015
CN 2676124 Y * 2/2005
(Continued)

OTHER PUBLICATIONS

Machine translation of CN2676124Y (Year: 2004).*
(Continued)

*Primary Examiner* — Richard M Rump
*Assistant Examiner* — Logan Laclair
(74) *Attorney, Agent, or Firm* — IP&T GROUP LLP

(57) ABSTRACT

Disclosed is a single process for producing hydrogen, carbon monoxide, and carbon from methane by forming gas products comprising hydrogen and carbon monoxide, and solid products comprising carbon and an iron-based catalyst from methane in a methane-containing feedstock through pyrolysis route involving auto-thermal reduction in a rotary kiln-type reactor in the presence of an iron-based catalyst and separating and recovering respective products.

18 Claims, 16 Drawing Sheets

(51) Int. Cl.
*C01B 32/205* (2017.01)
*C01B 32/40* (2017.01)

(52) U.S. Cl.
CPC ................. *C01B 2203/0277* (2013.01); *C01B 2203/1041* (2013.01); *C01B 2203/1241* (2013.01); *C01B 2203/1264* (2013.01); *C01B 2203/148* (2013.01); *C01B 2203/1623* (2013.01); *C01B 2203/1638* (2013.01); *C01B 2203/168* (2013.01)

(58) Field of Classification Search
CPC ........ C01B 2203/043; C01B 2203/1047; B01J 8/10; B01J 19/20; B01J 23/745; B01J 35/31; B01J 35/40
See application file for complete search history.

(56) References Cited

U.S. PATENT DOCUMENTS

| | | | |
|---|---|---|---|
| 2009/0074634 | A1 | 3/2009 | Tada et al. |
| 2012/0189530 | A1 | 7/2012 | Marmaro et al. |
| 2016/0016794 | A1 | 1/2016 | Noyes |

FOREIGN PATENT DOCUMENTS

| | | | | | |
|---|---|---|---|---|---|
| CN | 104627960 | A | | 5/2015 | |
| DE | 4011882 | A1 | | 10/1991 | |
| JP | 2014206344 | A | * | 10/2014 | |
| JP | 2019073411 | A | | 5/2019 | |
| JP | 2019075263 | A | * | 5/2019 | |
| KR | 20180002619 | A | | 1/2018 | |
| KR | 20180113448 | A | | 10/2018 | |
| WO | WO-2018170543 | A1 | * | 9/2018 | ........... C01B 32/205 |
| WO | 2020/121287 | A1 | | 6/2020 | |

OTHER PUBLICATIONS

Machine translation of JP2014206344A (Year: 2014).*

Office Action for Korean Patent Application No. 10-2022-0128653 issued by the Korean Patent Office on Jan. 19, 2026.

Office Action for Korean Patent Application No. 10-2023-0056859 issued by the Korean Patent Office on Feb. 11, 2026.

Extended European Search Report for the European Patent Application 24207745.1 issued by the European Patent Office on Feb. 19, 2025.

Extended European Search Report for the European Patent Application No. 23198211.7 issued by the European Patent Office on Mar. 12, 2024.

N. Z. Muradov, How To Produce Hydrogen From Fossil Fuels Without CO2 Emission, Int. J. Hydrogen Energy, vol. 18, No. 3, pp. 211-215, 1993.

M. Balakrishnan et al., Hydrogen production from methane in the presence of red mud—making mud magnetic, Green Chemistry, Nov. 12, 2008, pp. 42-47.

A. I. Alharthi et al., Hydrocarbon Cracking Over Red Mud and Modified Red Mud Samples, J. Sustain. Metall., Aug. 19, 2016, pp. 387-393.

Xiaoke Fang et al., A Nanomesoporous Catalyst from Modified Red Mud and Its Application for Methane Decomposition to Hydrogen Production, Journal of Nanomaterials, vol. 2016, Apr. 17, 2016.

James A. Bennett et al., Catalytic applications of waste derived materials, Journal of Materials Chemistry A, Jan. 20, 2016, 4, pp. 3617-3637.

Bikashbindu Das et al., A review on advances in sustainable energy production through various catalytic processes by using catalysts derived from waste red mud, Renewable Energy, May 31, 2019, 143, pp. 1791e1811.

Quanrun Liu et al., Preparation of Modified Red Mud-Supported Fe Catalysts for Hydrogen Production by Catalytic Methane Decomposition, Journal of Nanomaterials, Nov. 27, 2017, vol. 2017.

Robert C. Brown, Process Intensification through Directly Coupled Autothermal Operation of Chemical Reactors, Joule, 4, pp. 2268-2289, Nov. 18, 2020.

Argonne National Laboratory and Pacific Northwest National Laboratory, R&D Opportunities for Development of Natural Gas Conversion Technologies for Co-Production of Hydrogen and Value-Added Solid Carbon Products, Nov. 2017, ANL-17/11, PNNL-26726.

* cited by examiner

PROCESS FOR PRODUCING HYDROGEN, CARBON MONOXIDE, AND CARBON FROM METHANE-CONTAINING FEEDSTOCK

BACKGROUND OF THE INVENTION

Field of the Invention

The present disclosure relates generally to a process for producing hydrogen, carbon monoxide, and carbon from a methane-containing feedstock.

Description of the Related Art

Methane is the most abundant compound in natural gas, and accounts for twice the amount of carbon as other known fossil fuel sources. Specifically, it has been reported that natural gas reserves are more extensive than those of coal and oil put together. With the gradual depletion of coal and oil reserves, utilization of natural gas is having a significant impact on the global energy balance. Hence, supply of natural gas such as methane is expected to last for more than 20 years longer than petroleum resources, and thus natural gas is emerging as the most realistic alternative raw material to replace petroleum in the era of depletion of petroleum resources and high oil prices. Also, compared to coal and oil, natural gas is generally considered to be a cleaner-burning fossil fuel that produces fewer greenhouse gas emissions and pollutants. Recently, there has been increased research into producing high value-added materials from methane.

In some cases, in order to produce high value-added materials from methane, a method of directly converting methane is known, and is representatively exemplified by an oxidative or non-oxidative coupling reaction of methane as described, for example, in Korean Patent Application Publication No. 10-2018-0113448. In particular, hydrogen may be formed when methane is converted into high-value C2+ hydrocarbons through a coupling reaction. Hydrogen has high energy efficiency per unit mass, and generates only water during combustion without other harmful byproducts. Based on these advantageous properties, the value of hydrogen as a clean energy source has recently been increasing.

In this regard, other known reaction routes for producing hydrogen from methane include a steam reforming reaction ($CH_4+H_2O \rightarrow 3H_2$), and a partial oxidation reaction of methane ($CH_4+\frac{1}{2}O_2 \rightarrow 2H_2$). However, such reactions are problematic in that a large amount of energy input is required due to their high endothermic characteristics. Also, these reactions generate $CO_2$ which is discharged as a byproduct.

Recently, a process for producing hydrogen from methane by a pyrolysis reaction ($CH_4 \rightarrow 2H_2$) in the presence of a catalyst such as an iron oxide ($Fe_2O_3$) catalyst has been developed. The economic feasibility of the entire process may be improved when the generated hydrogen is effectively recovered and utilized as described in the Int. J. Hydrogen Energy, Vol. 18, No. 3, pp. 211-215. Moreover, solid carbon generated together with hydrogen during the methane pyrolysis may be used as a fuel or the like, and as well, may be used as an electrode material (especially an anodic material) for a secondary battery, further increasing value thereof. This pyrolysis reaction does not generate greenhouse gases such as carbon dioxide due to the nature of the reaction.

Another known pyrolysis method of methane includes an auto-thermal reduction route in the presence of iron-based catalysts such as iron oxide. This method is capable of producing hydrogen and solid carbon without generating carbon dioxide, and also of further producing carbon monoxide as a semi-finished product. In this regard, a fluidized-bed reactor is known to be typically applied to auto-thermal reduction of methane. However, in the case in which iron-based catalysts are used in a fluidized-bed reactor, difficulty of fluidization operation increases due to a change in the particle density depending on the progress of the reaction, and design of the reactor for continuous operation becomes complicated.

As such, there is a need for a method capable of solving the problems of conventional techniques and at the same time producing high value-added materials, especially hydrogen, carbon-based materials, and the like, from methane.

SUMMARY OF THE INVENTION

Generally, the present invention relates to a novel process for producing hydrogen, carbon monoxide, and carbon from a methane-containing feedstock such as natural gas. More particularly, the present disclosure relates to a single process for producing hydrogen, carbon monoxide, and solid carbon from methane by forming gas products comprising hydrogen and carbon monoxide, and solid products comprising carbon and iron-based catalysts from methane in a methane-containing feedstock through a pyrolysis route involving auto-thermal reduction in a rotary kiln-type reactor in the presence of iron-based catalysts and separating and recovering respective products.

Accordingly, an object of the present invention is to provide an efficient method producing high-purity hydrogen, carbon monoxide, and solid carbon from methane efficiently.

Another object of the present invention is to provide a single reaction system.

Yet another object of the present invention is to provide a method of alleviating, problems such as difficulty in continuous operation that may occur when solid catalyst particles are used for methane pyrolysis in a typical fluidized-bed reactor.

Yet another object of the present invention is to use a rotary kiln reactor.

According to an embodiment of the present invention, a process for producing hydrogen ($H_2$), carbon monoxide (CO), and solid carbon (C) from methane is provided which comprises:

a) forming pyrolysis products containing unreacted methane, solid carbon, hydrogen, and carbon monoxide by introducing a methane-containing feedstock and iron oxide-containing catalysts in the form of solid particles into a rotary kiln-type reactor, b) separating a gas mixture containing the unreacted methane, the hydrogen, and the carbon monoxide and an iron (Fe)-containing carbon-based solid from the pyrolysis products through gas-solid separation, and c) separating the gas mixture into unreacted methane, hydrogen and carbon monoxide, respectively.

According to an embodiment, in the gas mixture, a molar ratio of hydrogen ($H_2$)/carbon monoxide (CO) may be adjusted to range from 20 to 70, and a molar ratio of hydrogen ($H_2$)/methane ($CH_4$) may be adjusted to range from 1 to 60.

According to an embodiment, the methane-containing feedstock and the iron oxide-containing catalyst in the form of solid particles may be introduced into the rotary kiln-type reactor in a co-current flow manner.

According to an embodiment, the rotary kiln-type reactor may comprises:

a tube configured to accommodate solid particles and gas and to be rotatable;

a heater configured to supply controlled heat to an inner space of the tube;

a helix baffle configured to extend along an inner circumferential surface of the tube to induce the introduced iron oxide-containing catalysts in the form of solid particles to move forward in a longitudinal direction of the tube according to rotation of the tube; and at least one lifter provided on the inner circumferential surface of the tube corresponding to at least one among pitches of the helix baffle to disperse the introduced iron oxide-containing catalysts in the form of solid particles in the tube.

According to an embodiment, the at least one lifter may have at least one of a straight shape or a bent shape.

According to an embodiment, the bent shape may be a shape bent in an oblique line or a shape bent at a right (or perpendicular) angle.

According to an embodiment, in the rotary kiln-type reactor, a rotational speed of the tube may be adjusted to range from 0.05 to 5 rpm, and a residence time of the iron oxide-containing catalysts in the form of solid particles may be adjusted to range from 1 to 150 hours.

According to an embodiment, a helix angle of the helix baffle may be adjusted to range from 30 to 60°.

According to an embodiment, a pitch length of the helix baffle may range from 1/60 to 1/6 of a length of the tube.

According to an embodiment, a height of the helix baffle may be adjusted to range from 1/10 to 1/2 of an inner diameter of the tube, and a height of the lifter may be adjusted to range from 1/10 to 1/2 of the inner diameter of the tube.

According to an embodiment, a ratio of a length to an inner diameter of the tube (L/D) may be set to range from 5 to 50.

According to an embodiment, the iron oxide-containing catalysts in the form of solid particles may have an apparent density ranging from 0.7 to 2.8 g/cm$^3$, and the iron (Fe)-containing carbon-based solid may have an apparent density ranging from 0.05 to 1.5 g/cm$^3$.

According to an embodiment, an angle of repose of the iron (Fe)-containing carbon-based solid may be at least 10°.

According to an embodiment, the carbon in the pyrolysis products may be graphitic carbon.

BRIEF DESCRIPTION OF THE DRAWINGS

The above and other objects, and features of the present disclosure will be more clearly understood from the following detailed description taken in conjunction with the accompanying drawings, in which.

DETAILED DESCRIPTION OF THE INVENTION

The present disclosure can be worked in its entirety based on the following description. The following description should be understood as describing embodiments of the present disclosure and should not be construed as limiting the scope of the present disclosure. In addition, the accompanying drawings are provided for better understanding of the present disclosure and should not be construed as limiting the scope of the present disclosure.

Terms used herein may be defined as follows.

The term "solid carbon" or "carbon-based material" may refer to elemental carbon having an arbitrary structure in a broad sense and may be understood as a concept including various forms, such as a graphitic form, an amorphous form (e.g., carbon black and activated carbon), and the like, and may refer to graphitic carbon or carbon-based material in a narrow sense.

The term "pyrolysis" refers to a reaction in which hydrocarbons are decomposed upon exposure to heat, for example higher than approximately 400° C. in the absence of oxygen or oxygen-containing compounds, and in the context of the present disclosure, refers to a reaction that converts a compound into one or more other materials by applying heat thereto.

The term "conversion" may refer to the number of moles of the feedstock converted into a compound other than the feedstock per unit mole thereof.

The term "selectivity" may refer to the number of moles of a target product per unit mole of the converted feedstock.

The term "pitch" may refer to a distance or spacing between a screw thread and an adjacent screw thread (or a valley and an adjacent valley).

The term "angle of repose" may refer to a maximum inclination angle at which the slope face of a solid may be stabilized (i.e., the steepest angle of descent relative to the horizontal plane on which a solid granular material can be piled without slumping). The angle of repose is an inherent property of a granular material, and each granular material may have a unique angle of repose.

The term "helix angle" may refer to an angle between a tangent to the helix and an axis of the helix.

The term "hydrogen yield" may refer to a ratio of mass of hydrogen produced per mass of active metal, where the unit may be represented as $gH_2/gFe$.

Figure 1:
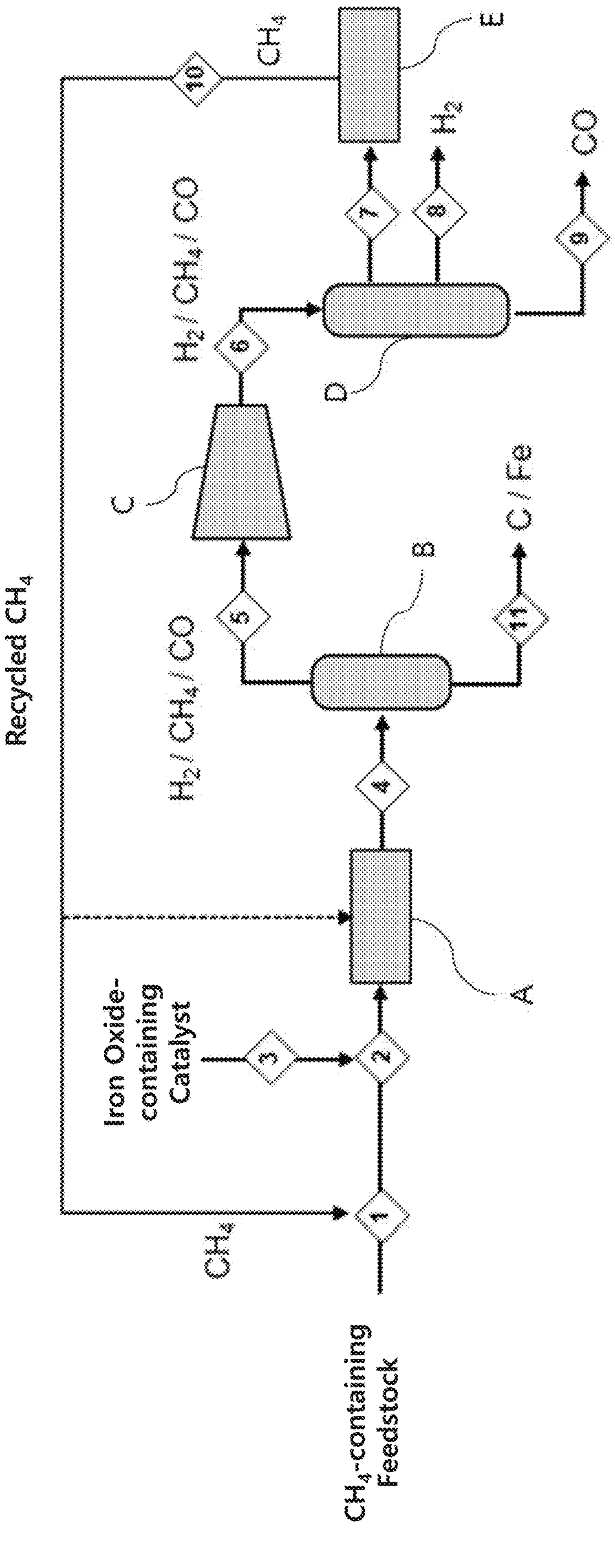
FIG. 1 schematically shows a single process for producing hydrogen, carbon monoxide, and a carbon-based material from a methane-containing feedstock according to an embodiment.

According to an embodiment of the present disclosure, a single process is provided in a manner in which methane in a methane-containing feedstock is converted into gaseous hydrogen and carbon monoxide and solid carbon (or a carbon-based material) by reaction mechanisms (or routes) including auto-thermal reduction, followed by separation and recovery thereof. A process configuration according to an embodiment for illustrative purpose is as shown in FIG. 1.

With reference to the drawing, the methane-containing feedstock may be gaseous and may be introduced into a methane pyrolysis process 100 via line 1.

The methane-containing feedstock may be at least one selected from among pure methane, liquefied natural gas, natural gas, a mixed gas composed mainly of methane. The mixed gas may be composed of, for example, at least about 50 vol % of methane, at least about 80 vol % of methane, at least about 90 vol % of methane, and the like. In this regard, natural gas mainly contains methane, and may further comprise, in addition to methane, a hydrocarbon gas component (e.g., at least one selected from the group consisting of ethane, propane, and heavier hydrocarbons) and/or a diluent gas (e.g., at least one selected from the group consisting of nitrogen, oxygen, carbon dioxide, helium, and hydrogen sulfide). Here, the concentration of the diluent gas in the feedstock may be, for example, about 15 vol % or less, for example about 12 vol % or less, for example about 10 vol % or less. According to a specific embodiment, the methane-containing feedstock may be pure methane.

In an embodiment, the methane-containing feedstock is combined with an iron oxide-containing catalysts in the form of solid particles supplied via line 3, and the gaseous methane-containing feedstock and the iron oxide-containing catalysts are introduced into a rotary kiln-type reactor A via line 2.

In this regard, hydrogen is typically produced from methane by steam reforming, but in this reaction route, carbon dioxide is generated together with hydrogen, causing greenhouse gases. Moreover, methane, which is a stable nonpolar molecule as an inert gas, has C—H binding energy of about 435 kJ/mol, and thus has high thermodynamic stability and is not easily decomposed.

Therefore, to cleave the strong C—H bonds of methane molecules, pyrolysis reaction in the pyrolysis reactor A involves or includes auto-thermal reduction in which the iron oxide-containing catalysts are reduced using methane as a reducing agent. Here, auto-thermal reduction in the presence of iron oxide-containing catalysts may be based on a reaction mechanism represented in Equation 1 below.

$$Fe_2O_3 + 3CH_4 \rightarrow 2Fe + 3CO + 6H_2 \quad \text{[Equation 1]}$$

As represented in the reaction Equation 1, the iron oxide-containing catalysts are converted to a reduced form (particularly, elemental iron) due to reaction with methane. In this auto-thermal reduction, unlike the steam reforming reaction of methane, carbon dioxide is not generated, carbon monoxide is formed as well as hydrogen, and iron oxide is reduced to elemental iron, which could be further employed as a catalyst. For example, the iron thus reduced may act as an active catalyst for methane pyrolysis to produce solid carbon (C) and hydrogen.

According to an embodiment, the iron oxide-containing catalysts may be at least one selected from among, for example, iron oxide, iron ore, iron-supported catalyst, red mud and the like. In this regard, eight types of iron oxide are widely known and each type of iron oxide depends on the oxidation state thereof. In view of availability and cost, iron ore including hematite ($\alpha$-$Fe_2O_3$) or maghemite ($\gamma$-$Fe_2O_3$) with the chemical formula of $Fe_2O_3$ is widely used. Typically, the amount of iron (Fe) (elemental basis) in iron ore may fall in the range of, for example, about 60 to 70 wt %, for example about 62 to 68 wt %, or for example about 64 to 66 wt %. Here, the amount of iron may vary depending on the origin thereof.

Also, for the iron-supported catalyst, the support may be a porous inorganic oxide material such as alumina ($Al_2O_3$), silica ($SiO_2$), magnesia (MgO), titania ($TiO_2$), zirconia ($ZrO_2$), etc. For example, the porous support may have Brunauer-Emmett-Teller (BET) specific surface area ranging from 100 to 200 $m^2/g$. For example, the porous support may have BET specific surface area ranging from about 130 to 180 $m^2/g$, or about 150 to 170 $m^2/g$. The porous support may also have a pore volume ranging from about 0.4 to 1 $cm^3/g$. For example, the porous support may have a pore volume, for example, ranging from about 0.5 to 0.9 $cm^3/g$, or about 0.6 to 0.8 $cm^3/g$. Moreover, the amount of iron, in the form of elemental iron and/or iron oxide, in the iron-supported catalysts may fall in the range of, for example, about 5 to 40 wt %, about 7 to 20 wt %, or about 9 to 15 wt %.

According to an embodiment, red mud may be used as the iron oxide-containing catalysts. Red mud is waste residue generated in the process of manufacturing alumina from bauxite, and contains a significant amount of iron oxide. In an embodiment, red mud may be provided in the form in which red mud is used alone, or alternatively, in which red mud is used in combination with other iron oxide-containing catalysts as described above (e.g., iron oxide, iron ore, and/or iron-supported catalyst). Red mud may exhibit properties of a mixed oxide containing iron oxide and aluminum oxide as main components, and may have various compositions depending on the source thereof (e.g., a bauxite processing plant). Exemplary compositional ranges of the main ingredients constituting red mud may be shown in Table 1 below, but are not limited thereto.

TABLE 1

| Component | Amount |
|---|---|
| $Fe_2O_3$ | For example, about 20 to 70 wt %, about 30 to 60 wt %, or about 35 to 40 wt % |
| $Al_2O_3$ | For example, about 5 to 40 wt %, about 10 to 30 wt %, or about 15 to 25 wt % |
| $SiO_2$ | For example, about 0 to 30 wt %, about 5 to 25 wt %, or about 10 to 20 wt % |
| $TiO_2$ | For example, about 0 to 30 wt %, about 5 to 20 wt %, or about 7 to 15 wt % |
| $Na_2O$ | For example, about 0 to 20 wt %, about 2 to 15 wt %, or about 5 to 10 wt % |
| CaO | For example, about 0 to 20 wt %, about 2 to 15 wt %, or about 5 to 10 wt % |

Red mud may further contain additional ingredients ($K_2O$, $P_2O_5$, MnO, etc.) as well as the ingredients listed in the table above, and the amount of such additional ingredients may be, for example, about 5 wt % or less, for example about 3 wt % or less, or for example about 1.5 wt % or less. In this regard, since iron oxide ($Fe_2O_3$) in red mud acts as the main catalytic component of catalytic pyrolysis of methane, an increase in the amount of iron oxide may facilitate the conversion of methane during pyrolysis, and also affect the yield of hydrogen, carbon, and/or carbon monoxide. According to an embodiment, LOI (loss on ignition) of red mud may be, for example, about 20 wt % or less, for example about 3 to 15 wt %, or for example about 5 to 12 wt %, which may be understood for illustrative purposes. The iron oxide (e.g. $Fe_2O_3$)-containing catalysts in the form of solid particles may have average particle sizes, for example, ranging from about 20 to 500 μm, about 45 to 425 μm, about 100 to 300 μm, or about 106 to 180 μm, when analyzed by a sieve method. The particle size (or size) of the iron oxide-containing catalysts may affect catalytic reaction and transfer in a rotary kiln. When the particle size thereof is too small, injection using a supply unit or a feeder may become difficult. Accordingly, the iron oxide-containing catalysts having the size falling into the above range may be advantageous for the process for producing hydrogen, carbon monoxide, and solid carbon.

According to an embodiment, when red mud-containing catalysts are introduced into the process 100, a specific surface area (BET) thereof may be, for example, about 10 to 50 $m^2/g$, for example about 20 to 40 $m^2/g$, or for example about 25 to 30 $m^2/g$. In addition, the pore size (average diameter) may be, for example, about 10 to 50 nm, for example about 15 to 40 nm, for example about 18 to 30 nm, or for example about 20 to 25 nm. However, the aforementioned pore characteristics may be understood for illustrative purposes.

Meanwhile, for example, when iron ore and/or red mud is used as a catalyst, it may be pulverized to an appropriate size (particle size). Here, pulverization may be performed using means known in the art. Examples of the pulverization means may include, but are not limited to, a roller-type grinder, a vibrating mill, a ball mill, a port mill, a hammer mill, a pulverizer, a gyratory grinder, a gyratory mill, and the like, and a combination of two or more thereof may also be used for pulverization.

Also, when the pyrolysis system is built on lab-scale, the flow rate (standard liter per minute; slm) of the methane-containing feedstock supplied to the reactor may be adjusted, for example, to range from about 0.5 to 5 slm, about 1 to 3 slm, about 1.2 to 2.5 slm, about 1.3 to 2 slm, or about 1.5 to 1.9 slm. Moreover, the flow rate of the iron oxide-containing catalysts may be adjusted, for example, to range from about 15 to 80 cc/hr, 18 to 65 cc/hr, about 25 to 55 cc/hr, or about 31 to 50 cc/hr. In a commercial process, however, the absolute value of each of the flow rate of the methane-containing feedstock and the flow rate of the iron oxide-containing catalyst may increase and thus may be adjusted in consideration of the ratio between the flow rate of the feedstock and the flow rate of the catalysts. For example, the ratio of the flow rate of the catalysts divided by the flow rate of methane may range from about 0.05 to 2.6. For example, the ratio may range from about 0.1 to 1, from about 0.15 to 0.7, or from about 0.2 to 0.6. However, the ratio may not be limited to the above ranges.

In the illustrated embodiment, the methane-containing feedstock and the iron oxide-containing catalysts in the form of solid particles are introduced into a rotary kiln-type reactor in a co-current flow manner. Introducing the catalysts and the methane-containing feedstock in the co-current flow manner is advantageous because if they are introduced in a counter-current manner may cause production of water ($H_2O$) and consumption of the hydrogen produced by the reaction between hydrogen generated during pyrolysis and iron oxide ($Fe_2O_3$) in the introduced catalysts.

According to an embodiment, the methane pyrolysis reactor A is a rotary kiln-type reactor, the use of which may solve problems related to auto-thermal reduction of methane using a fluidized-bed reactor, such as increased operation difficulties due to a change in particle density and the like and difficulty in continuous operation. In particular, the rotary kiln-type reactor is less affected by the particle size of the catalysts and is easy to operate due to a large density difference between the iron oxide-containing catalysts used in the pyrolysis and the carbon produced by reaction (e.g., appearance density of iron ore: 2.24 $g/cm^3$, appearance density of red mud: 1.04 $g/cm^3$, apparent density of carbon: 0.14 $g/cm^3$).

Also, as the pyrolysis proceeds, the carbon-based material attached to the iron-based solid particles has a high angle of repose (about 52°), such that volume utilization inside the rotary kiln increases, and accordingly the residence time of the solid increases, raising reactivity (e.g., the pyrolysis may proceed in a way that at least about 10%, for example about 30 to 50% of the volume of the rotary kiln reactor is filled with solid). The angle of repose of the iron (Fe)-containing carbon-based solid produced by pyrolysis may be, for example, at least about 10°, for example at least about 30°, for example at least about 50°.

In this regard, the residence time (T) of the solid in the rotary kiln-type reactor is proportional to the length/diameter ratio (L/2r) of the kiln and the angle of repose (φ), and is inversely proportional to the inclination and rotational speed of the kiln, and may be represented by Equation 2 below.

$$\tau = \frac{L\sin(\varphi)}{2\pi r\omega\Phi} \quad \text{[Equation 2]}$$

Here, L is the length of the kiln (or tube in the rotary kiln), φ is the angle of repose, r is the radius of the kiln (or tube in the rotary kiln), Φ is the inclination of the kiln, and co is the rotational speed.

According to an embodiment, the reaction temperature (pyrolysis temperature) in the rotary kiln-type reactor may be adjusted to range from, for example, about 600 to 1,000° C., about 700 to 950° C., about 750 to 900° C., about 780 to 850° C., or about 800 to 830° C. Moreover, the pyrolysis may be carried out in an atmosphere of pressurized gas. Here, the reaction pressure is not particularly limited, but may be adjusted to range from, for example, about 0.1 to 10 bar, about 0.5 to 5 bar, about 1 to 2 bar, or about 1.3 to 1.8 bar.

Also, the residence time of the solid catalysts (for example, iron oxide-containing catalysts) in the reactor may be adjusted to range from, for example, about 1 to 150 hours, about 10 to 120 hours, or about 15 to 100 hours.

Carbon dioxide ($CO_2$) is not generated in a mechanism of auto-thermal reduction reaction of methane, but a trace amount of carbon dioxide (or carbon dioxide and water) may be generated as a byproduct during the actual pyrolysis in which iron oxide ($Fe_2O_3$) is reduced to a metallic form thereof while forming carbon oxide. This side reaction may be remarkable when using an inexpensive iron oxide-containing catalysts, namely iron ore catalysts. As a result, an induction period, which is a section until the methane conversion is reached to the peak, may be formed during the pyrolysis reaction involving the auto-thermal reduction of methane.

The conversion of methane in the pyrolysis reaction may be adjusted to range of at least about 15%, from about 20 to about 95%, or from about 40 to about 93%. For example, the conversion may range from about 60 to about 92%, from about 70 to about 90%, or from about 80% to about 85%. Here, the conversion of methane may be increased to a certain level or more by operation at an elevated reaction temperature, but the amount of hydrogen produced may be decreased due to heat loss caused by high-temperature operation, increased catalyst deactivation, etc. Hence, it may be advantageous to control the conversion of methane in consideration of the desired amounts of hydrogen and carbon produced and the amount of hydrogen produced per active metal in the catalyst.

Also, respective selectivity values of hydrogen and carbon monoxide in the gas products (e.g., based on a conversion of methane of 90%) may be, for example, at least about 1% (for example at least about 1.5%, for example at least about 2%), and at least about 1% (for example at least about 1.5%, for example about 2 to 5%).

According to a particular embodiment, when red mud is used as a pyrolysis catalyst, the selectivity of carbon monoxide in the gas products (e.g., based on a conversion of methane of 60%) may be, for example, at least about 1%, for example at least about 1.1%, or for example about 1.2 to 2%. In this case, when hydrogen and carbon monoxide are generated by the auto-thermal reduction during the pyrolysis, the selectivity of carbon monoxide in the gas products (e.g., based on a conversion of methane of 90%) may be, for example, at least about 1.3%, at least about 1.5%, or about 1.6 to 3%. However, the selectivity values for hydrogen and/or carbon monoxide may not limited to the above ranges in the present invention.

Referring back to FIG. 1, as iron oxide ($Fe_2O_3$) in the catalysts is reduced by methane in the rotary kiln-type reactor A, a gas mixture containing unreacted methane as well as hydrogen and carbon monoxide, and solid carbon may be produced. Here, the solid carbon may be graphitic carbon. Graphite has a layered structure, where plate-shaped two-dimensional graphene, in which carbon atoms are linked in a hexagonal shape, is stacked. The graphitic carbon produced in the present embodiment may be composed of, for example, about 15 to 30 layers of graphene, for example about 18 to 25 layers of graphene. The carbon thus produced may be combined with catalyst particles to form an iron (Fe)-containing carbon-based solid (C/Fe).

Notably, the carbon produced by pyrolysis is attached to the catalyst particles, resulting in a solid, the weight of which is increased by at least about 3 times, for example about 4 to 10 times, for example about 5 to 9 times compared to the weight of iron that is an active metal in the iron-based catalysts introduced at the beginning of the reaction.

Also, as the reaction progresses in the rotary kiln-type reactor as described above, the amount of carbon attached to the catalyst particles may increase, thus increasing the angle of repose compared to the initial iron-based particles.

As an example, the apparent density of the iron oxide-containing catalysts in the form of solid particles introduced into the reactor A may range from, for example, about 0.7 to 2.8 g/cm$^3$, for example about 0.8 to 2.5 g/cm$^3$, for example about 0.9 to 2.25 g/cm$^3$, for example about 1 to 2 g/cm$^3$, for example about 1.1 to 1.8 g/cm$^3$, or for example about 1.2 to 1.5 g/cm$^3$, whereas the apparent density of the iron (Fe)-containing carbon-based solid discharged from the reactor A may range from, for example, about 0.05 to 1.5 g/cm$^3$, for example about 0.1 to 0.7 g/cm$^3$, for example about 0.12 to 0.4 g/cm$^3$, or for example about 0.15 to 0.2 g/cm$^3$.

The reason why unreacted methane is contained in the gas products in the present embodiment is that a thermodynamic equilibrium of methane, hydrogen, carbon monoxide, and carbon is formed during the pyrolysis with an increase in the internal temperature of the reactor and thus the conversion of methane does not rise any more.

In the illustrated embodiment, the gas mixture and the iron (Fe)-containing carbon-based solid (C/Fe) may be separated from each other using a gas-solid separator B via line 4, and examples of the separator may include a cyclone, a hydrocyclone, a gravity settling device, a spray scrubber, a venturi scrubber, a bag filter, a pocket filter, an electrostatic precipitator, and the like. By gas-solid separation, the gas mixture containing hydrogen, carbon monoxide, and methane may be transferred through line 5 and the iron (Fe)-containing carbon-based solid may be separated and recovered through line 11. As an example, a high-purity carbon-based material may be obtained by removing iron from the iron-containing carbon-based solid using a refining technique known in the art, and a detailed description thereof will be omitted.

According to an embodiment where a methane conversion ranges from 50 to 90%, the molar ratio of hydrogen ($H_2$)/carbon monoxide (CO) in the gas mixture may be adjusted to range from, for example, about 20 to 70, for example about 30 to 65, for example about 35 to 60, or for example about 40 to 55, and may be about 55 in a specific embodiment.

Also, the molar ratio of hydrogen ($H_2$)/methane ($CH_4$) in the gas mixture (e.g., based on a methane conversion of 50 to 90%) may be adjusted to range from, for example, about 1 to 60, for example about 2 to 55, for example about 3 to 50, for example about 5 to 45, or for example about 10 to 20. Specifically, based on the methane conversion of 90%, the molar ratio thereof may be adjusted to range from about 10 to 60, for example about 13 to 50, for example about 16 to 40, or for example about 23 to 30. Based on the methane conversion of 70%, the molar ratio thereof may be adjusted in the range of about 3 to 10, for example about 4 to 8, for example about 5 to 6. Based on the methane conversion of 60%, the molar ratio thereof may be adjusted to range from about 1 to 10, for example about 2 to 7, or for example about 3 to 5. Based on the methane conversion of 50%, the molar ratio thereof may be adjusted to range from about 1 to 4, for example about 1.5 to 3, or for example about 2 to 3. In a specific embodiment, the molar ratio of hydrogen ($H_2$)/methane ($CH_4$) in the gas mixture may be about 26. In another specific embodiment, the molar ratio of hydrogen ($H_2$)/methane ($CH_4$) in the gas mixture may be about 3 (based on the methane conversion of 60%).

For the iron (Fe)-containing carbon-based solid, the molar ratio of carbon (C)/iron (Fe) (e.g. based on a methane conversion of 50 to 90%) may be adjusted to range from, for example, about 25 to 60, for example about 30 to 50, for example about 35 to 45, and may be about 42 in a specific embodiment.

As described above, the gas mixture separated using the gas-solid separator B may be transferred to a process gas compressor C and pressurized. Here, the reason why pressurization is performed is due to a downstream adsorption process. As an example, the increased pressure may be determined considering a difference in adsorption capacity depending on the pressure of the adsorbent. For example, in a 4-tower pressure swing adsorption (PSA) process, the adsorption pressure to achieve a hydrogen recovery of 85 to 90% may range from at least about 10 bar, for example about 12 to 25 bar, or for example about 15 to 20 bar.

With reference to FIG. 1, the pressurized gas mixture may be separated into hydrogen, carbon monoxide, and methane via line 6 using a gas separation technique known in the art. Examples of the gas separation technique may include pressure swing adsorption (PSA), vacuum swing adsorption (VSA), membrane separation, and the like. In the illustrated embodiment, the pressurized gas mixture may be transferred to a PSA unit D, in which the PSA unit D may be filled or packed with an adsorbent corresponding to the type of gas to be separated. Here, PSA, as is known in the art, may be a technique for separating gases using adsorption capacity which varies depending on a difference in pressure and adsorption characteristics of solid adsorbents to gaseous materials.

In this regard, the PSA unit may be typically filled with an adsorbent corresponding to the molecular size and adsorption strength of the gas component. Here, the pore size of the adsorbent capable of selectively adsorbing each of carbon monoxide and methane may fall in the range of about 4 to 5 Å. However, hydrogen with the lowest adsorption strength may be separated without being adsorbed.

Typically, absorbents may include (i) molecular sieves (e.g., 4A zeolite, 5A zeolite) for nitrogen, carbon monoxide, and methane, (ii) activated carbon for methane, C2 and C3 hydrocarbons, and carbon dioxide, (iii) silica gel for C3 or higher hydrocarbons, and (iv) activated alumina for aromatics, $H_2S$, $H_2O$, HCl, etc., wherein adsorption strength increases in the order from (i) to (iv). However, in the present embodiment, since the gas mixture generated by pyrolysis mainly contains hydrogen, carbon monoxide, and methane, three gas components may be separated from each other only using a molecular sieve and activated carbon. Briefly, hydrogen, carbon monoxide, and methane are produced as pyrolysis products, and thus the number of adsorbents required for gas separation may be decreased.

The types of adsorbents and principles of adsorption and desorption for separating hydrogen, carbon monoxide, and methane are known in the art, and a description thereof will be omitted. According to an embodiment, however, desorption operation conditions may be set depending on target recovery of hydrogen, carbon monoxide, and methane. In this regard, the recovery may increase with a decrease in desorption pressure, and the purity of the separated gas may decrease with an increase in the recovery. Considering this correlation, the desorption operation pressure to achieve a hydrogen recovery rate of about 85 to 90% may be set to range from about 1 to 1.5 bar.

As described above, through the gas mixture separation process, methane, hydrogen, and carbon monoxide are discharged through respective lines 7, 8 and 9. As such, hydrogen and carbon monoxide may be recovered as target products. On the other hand, methane may be recycled through a splitter E and may be combined with a fresh methane-containing feedstock via line 10.

Figure 2:
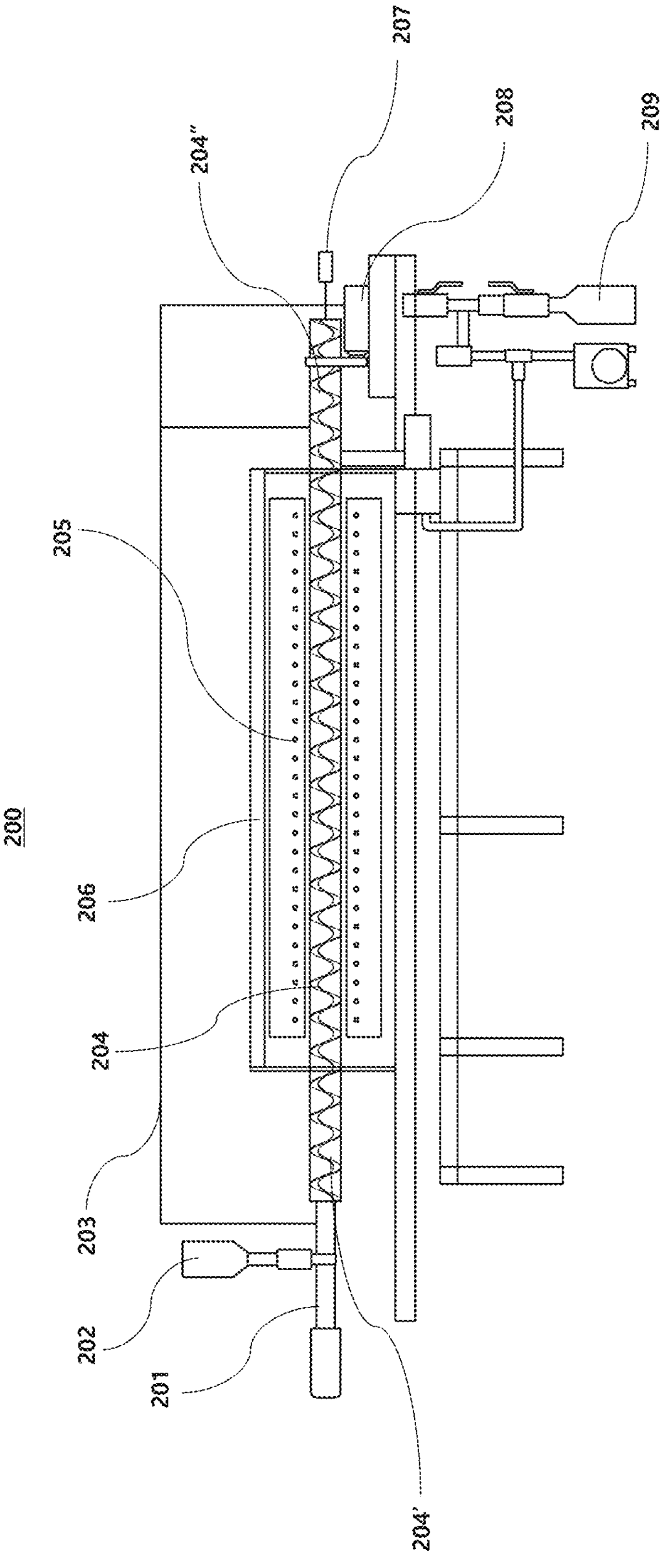
FIG. 2 shows the overall structure of a rotary kiln reactor applicable to pyrolysis of a methane-containing feedstock according to an embodiment.

According to an embodiment of the present disclosure, the configuration of the rotary kiln reactor applicable to the reaction involving methane auto-thermal reduction is schematically shown in FIG. 2.

With reference to the drawing, as described above, the gaseous methane-containing feedstock is introduced into a rotary kiln reactor 200 via line 201, after which iron oxide-containing catalysts are supplied in a controlled amount by valve operation from a catalyst storage device (e.g. a hopper 202), combined with the methane-containing feedstock, and then introduced together into a tube 204 in the rotary kiln reactor. The tube 204 provides a space for pyrolysis (including auto-thermal reduction of methane) to occur while accommodating solid particles (i.e., iron oxide-containing catalysts) and gas (i.e., methane-containing feedstock). Moreover, the material of the tube 204 is not particularly limited, but may be at least one selected from among, for example, alumina, SiC, FeCrAl alloy, Inconel (NiCr), heat-resistant stainless steel, and the like.

In the illustrated embodiment, the tube 204 is configured such that buffer tubes are connected or linked to both sides of a central work tube. In the illustrated embodiment, the buffer tubes may include an inlet buffer tube 204' and an outlet buffer tube 204". Here, the work tube may indicate an area of the tube in which pyrolysis occurs by receiving heat necessary for the reaction in the inner space of the tube 204. As an example, a heater 205 may be provided outside the tube 204 along the length of the work tube. Hereinafter, for consistency of description, "tube" refers to the work tube in which the reaction takes place.

According to an embodiment, the ratio of the length of the tube 204 to the inner diameter of the tube 204 (L/D) may be determined in consideration of the residence time of the iron-based catalysts, and may be set to range from, for example, about 5 to 50, about 10 to 30, or about 15 to 20. However the ratio may not be limited to the above ranges.

As the heater 205, any heater known in the art may be used, so long as it is able to supply heat sufficient for pyrolysis into the work tube. Specifically, any heater capable of supplying heat sufficient for forming free methyl radicals as an activated form of methane and reducing iron oxide in the catalysts may be used. This heater may be provided outside and/or inside the tube 204. Examples of the heater 205 may include a heat exchanger, a heating coil, and a combustion heater, which may be used alone or in combination. In the illustrated example, the heater 205 may be provided in a way to surround at least a portion of the outside of the tube 204, whereby heat may be transferred to the inner space through the wall of the tube 204.

Also, a housing 206 is configured to surround at least the work tube, making it possible to minimize external influence on the reaction conditions in the tube in which pyrolysis occurs.

In order to rotate the tube 204 in the rotary kiln reactor 200, a rotator 207, for example a motor, may be provided at any position. In FIG. 2, an inlet for the methane-containing feedstock and the solid particle catalyst may be provided at one end of the tube 204, and a motor may be provided at the remaining end (opposite end). Moreover, rotational force may be supplied to the tube 204 via a power transmission member mechanically connected or engaged with the motor, for example, a gear, belt, chain, or the like. Illustratively, it may be advantageous to consider the effect of the supply speed of the solid catalyst particles on the rotational speed of the tube 204 during pyrolysis (the methane conversion may decrease with a decrease in the supply speed of the solid catalyst particles, and transfer of the solid catalyst particles may become difficult with a decrease in the rotational speed of the tube 204).

Illustratively, the average hydrogen production depending on the supply speed of the solid particle catalyst and the rotational speed of the rotary kiln (or tube) under the constant temperature and pressure conditions (820° C., 1.4 bar) may vary as shown in Table 2 below.

TABLE 2

| Classification | Supply speed of catalysts (cc/hr) | Rotational speed of work tube (RPM) | Average hydrogen production (SLM) |
|---|---|---|---|
| 1 | 37.5 | 0.09 | 1.1 |
| 2 | 43.8 | 0.09 | 1.7 |
| 3 | 46.9 | 0.11 | 1.1 |
| 4 | 46.9 | 0.13 | 1.2 |
| 5 | 46.9 | 0.20 | 1.7 |
| 6 | 46.9 | 0.22 | 2.7 |

Considering this tendency, the rotational speed of the tube 204 may be adjusted within a range that is able to increase the average hydrogen production, for example, about 0.05 to 5 rpm, for example about 0.1 to 3 rpm, for example about 0.12 to 2 rpm, for example about 0.2 to 1 rpm.

According to an embodiment, due to co-current transfer of the solid iron oxide-containing catalyst particles and the methane-containing feedstock (gas), a pretreatment section and a reaction section may be separately provided in the tube 204. In the pretreatment section, the catalyst particles may be activated using methane, and the extent of activation may vary depending on the temperature. For example, when iron oxide-containing catalyst particles are activated at a relatively low temperature, which may be adjusted to range from about 600 to 800° C., for example about 700 to 780° C., or for example about 725 to 750° C., the amount (weight) of carbon produced per weight of iron that is an active metal may increase. As an example, in the pretreatment process, methane and catalyst particles may be introduced in a co-current manner into the tube 204, and the auto-thermal reduction route may be promoted under temperature conditions adjusted as described above, whereby the iron oxide-containing catalysts may be activated to form carbon monoxide and metallic Fe.

The rotary kiln reactor may be inclined at a predetermined angle in the direction of movement of the solid particles in order to control the residence time of the solid particles. Here, the inclination angle (slope) may be adjusted to range from about 0.01 to 10°, for example about 0.02 to 5°, for example about 0.05 to 2° on a horizontal basis. The inclination angle may be properly adjusted within the above range in consideration of the fact that the residence time of the solid catalyst particles decreases with an increase in the inclination of the kiln.

In the illustrated embodiment, gas and solid products produced by pyrolysis (involving auto-thermal reduction of methane) in the tube 204 of the rotary kiln reactor are discharged from the tube 204, and as mentioned in conjunction with FIG. 1, the gas mixture and the solid are separated from each other using a gas-solid separator 208. Here, the separated gas mixture may be recycled through line 203 and combined with fresh feedstock. On the other hand, the separated solid may be collected by a solid collector 209 or subjected to post-processing (e.g., purification) so as to be applied to other end uses.

According to an embodiment of the present disclosure, the efficiency of pyrolysis may be improved by introducing a screw and lifter combination into a tube of a rotary kiln-type reactor.

In this regard, the rotary kiln is generally known to be of a screw type (a type in which a screw shaft is inserted into a tube), an auger type, or the like. Among them, a screw-type rotary kiln is applied to transfer of solid with no change in volume (e.g., polymers, etc.), and a screw structure formed on a rotating shaft provided at the center of the tube allows the solid in the tube to move forward by action of a helix flight formed on the shaft according to the rotation of the shaft. However, when carbon generated by pyrolysis of methane occupies a much larger volume than the initially introduced catalyst particles as in the present embodiment, uniform contact between the gaseous reactant and the catalyst particles may be prevented and it may be difficult to carry out the reaction at a desired reaction temperature. In particular, as described above, it is preferable to fill the tube of the rotary kiln with a large volume of solid by the increased angle of repose, but when a screw shaft is present, it may be difficult to increase or control the residence time with an increase in the angle of repose. On the other hand, an auger-type rotary kiln is very suitable for reaction during which the volume of solid decreases, for example, reaction in which biomass is gradually pyrolyzed, but is not suitable for methane pyrolysis in which the volume of solid increases due to the generation of carbon during the reaction.

Taking into consideration the foregoing, in the present embodiment, unlike the conventional rotary kiln reactors, such as a screw-type rotary kiln reactor, a helix baffle is formed to extend along the inner circumferential surface of the tube so that solid particles (or solid) introduced into the tube are transferred. Therefore, the helix baffle formed on the inner circumferential surface of the tube rotates according to rotation of the tube, instead of having a screw shaft, unlike the conventionally known screw-type rotary kiln, thereby inducing forward movement of the solid.

Figure 3B:
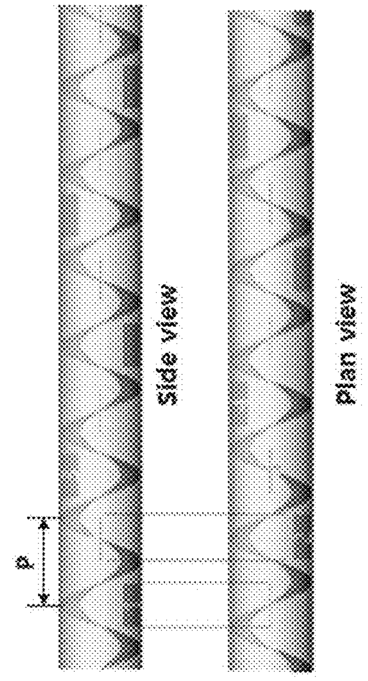
FIGS. 3A to 3C are a side view, a plan view, and a front view showing a combination of a helix baffle and lifters (one lifter per pitch) on the inner circumferential surface of a tube of a rotary kiln reactor according to an embodiment.
Figure 3C:
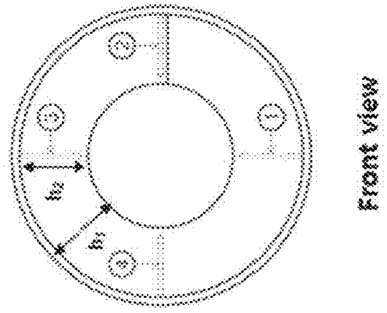
Figure 3A:
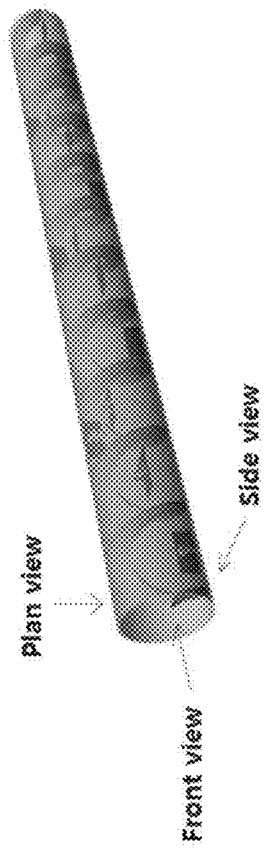

In this regard, FIG. 3 is a side view, a plan view, and a front view showing a combination of a helix baffle and lifters in the tube of the rotary kiln reactor usable in the present embodiment.

In the illustrated embodiment, the height $h_1$ of the helix baffle may affect the size of the moving space of the solid in the center of the tube (i.e, the cavity size inside the tube), and may be adjusted in the range of, for example, about 1/10 to 1/2, for example about 3/20 to 8/20, for example about 1/5 to 3/10 of the inner diameter (diameter) of the tube. Also, the pitch P of the helix baffle may be adjusted in the range of, for example, about 1/60 to 1/6, for example about 1/30 to 2/15, for example about 1/20 to 1/10 of the tube length. However, these dimensional ranges may be understood for illustrative purpose only, and thus may be changed in a scale-up process.

Further, the helix baffle essentially has a helix angle, and this helix angle may be determined depending upon the residence time of the solid catalysts. As an example, the helix angle of the helix baffle may be adjusted in the range of, for example, about 30 to 60°, for example about 35 to 55°, for example about 40 to 50°.

With reference to the drawing, a tube may have a plurality of pitches and include at least one lifter in the inner circumferential surface of the tube. Typically, some pitches may include a plurality of lifters, but in some cases, some pitches may not include any lifters. Lifters may have different shapes.

In the illustrated embodiment, one lifter is provided per pitch of the helix baffle. Each lifter is oriented at an angle of about 90 degrees in the anti-clockwise direction relative to the lifter provided at an adjacent pitch when viewed from the front (lifters 1 to 4 in FIG. 3). This arrangement may be understood for illustrative purpose only, and in the present embodiment, the angular orientation between the adjacent lifters may be properly adjusted to range from, for example, about 30 to 360°, for example about 50 to 180°, or for example about 60 to 120°.

In the illustrated embodiment, the height $h_2$ of the lifter may be determined in consideration of the height $h_1$ of the helix baffle, and may be adjusted to range from, for example, about 1/10 to 1/2, for example about 3/20 to 8/20, or for example about 1/5 to 3/10 of the inner diameter (diameter) of the tube. Furthermore, the thickness of the lifter is not particularly limited, and may fall in the range of, for example, about 1/20 to 1/2, for example about 1/10 to 2/5, or for example about 3/20 to 3/10 of the height $h_2$ of the lifter. In addition, according to an embodiment, the ratio of the height $h_2$ of the lifter to the height $h_1$ of the helix baffle may be adjusted to range from, for example, about 0.25 to 2, for example about 0.5 to 1.5, or for example about 0.75 to 1.25.

Figure 4:
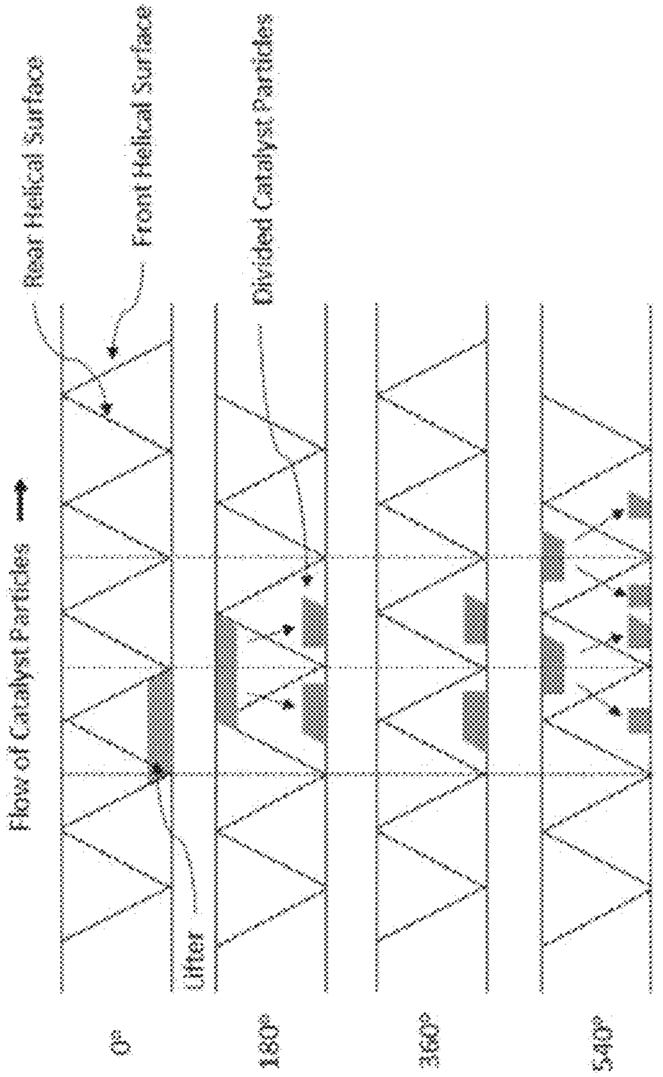
FIG. 4 schematically shows a process in which catalyst particles are divided by lifters in the tube of the rotary kiln reactor having a combination of a helix baffle and lifters.

In this regard, a change in the pyrolysis product (partial pressure) due to movement of the catalyst particles in the tube of the rotary kiln reactor with the combination of the helix baffle and the lifters and the process of dividing the catalyst particles by the lifters are schematically shown in FIG. 4.

With reference to the drawing, when the catalyst particles move along a helical surface in the rotating tube and contact (or collide) with the lifters, they move while being divided into spaces in front of and behind the pitch where each lifter is provided (i.e., residence time of the catalyst particles may be increased because the catalyst particles are dispersed during movement in the tube). In this way, by combining the lifters and the helix baffle formed on the inner circumferential surface of the tube in the rotary kiln reactor, the residence time of the solid, particularly the solid particle catalyst, in the reactor may be controlled. As such, the combination of the helix baffle and the lifters enables uniform contact between the gaseous methane-containing feedstock and the catalysts over a controlled period of time, thereby maximizing production of target products, such as hydrogen, carbon monoxide, and carbon. Moreover, the amount of the solid catalyst particles that move forward may be adjusted simply by changing the internal structure and dimensions of the tube, such as the number, shape, dimensions, and arrangement of lifters and the height and pitch of the helix baffle.

Figure 5B:
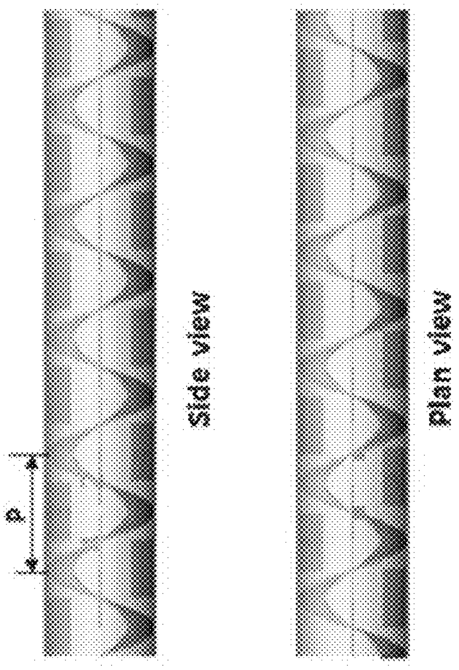
FIGS. 5A to 5C are a side view, a plan view, and a front view showing a combination of a helix baffle and lifters (four lifters per pitch) on the inner circumferential surface of a tube of a rotary kiln reactor according to another embodiment.
Figure 5C:
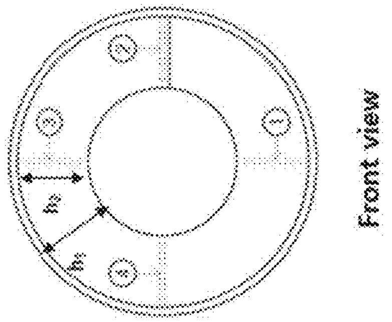
Figure 5A:
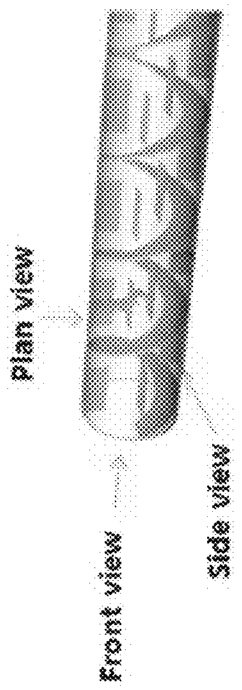

A modification in which a plurality of lifters (particularly, four lifters) per pitch of the helix baffle is provided at a predetermined angle to each other is shown in FIG. 5.

With reference to the drawing, a plurality of lifters is provided per pitch, and in the illustrated embodiment, four lifters are provided per pitch, which may be understood for illustrative purpose only. As an example, lifters of up to 12, for example 2 to 10, for example 3 to 6 may be provided per pitch. As other details have been described with regard to FIG. 3, a redundant description thereof will be omitted.

When the helix baffle and the lifters are combined in this way, disadvantages when separately installing the helix baffle and the lifters may be effectively alleviated. For example, when installing only the helix baffle, it may be advantageous to transfer the solid catalyst particles in the rotary kiln, but efficient contact between the catalyst and the gaseous feedstock may be difficult, and when installing only the lifters, contact between the catalyst and the gaseous feedstock may be improved, but it may be difficult to transfer the catalysts at a constant amount or speed.

Figure 6C:
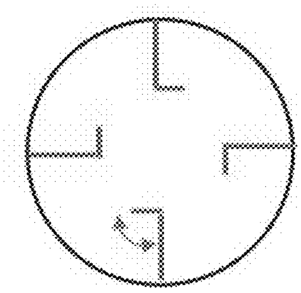
FIGS. 6A to 6C are front views showing various examples of lifter shapes in the tube of a rotary kiln reactor.
Figure 6B:
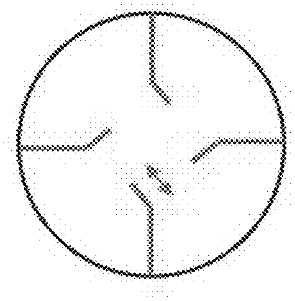
Figure 6A:
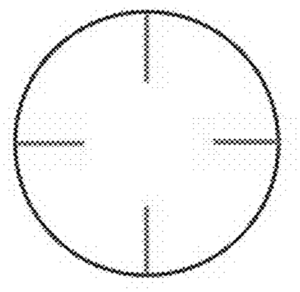

Various examples of the shapes of the lifters provided in the tube of the rotary kiln reactor are shown in FIGS. 6A to 6C.

Specifically, FIG. 6A shows a straight lifter, and FIGS. 6B and 6C show bent lifters. In FIG. 6B, since the lifter has a shape bent in an oblique line, the function of increasing the lifting amount (volume) of the catalysts and the lifting height of the catalysts may be enhanced due to the increased volume of the lifter. Also, in FIG. 6C, the lifter has a shape bent at an angle of about 90° (or a rectangular lifter), and as such, an increase in the lifting height of the catalysts is more remarkable.

A better understanding of the present disclosure may be obtained through the following examples. These examples are merely set forth to illustrate the present disclosure and are not to be construed as limiting the scope of the present disclosure.

EXAMPLES

Throughout Examples and Comparative Examples, high-purity methane (99.97%) or natural gas simulated composition was used as a methane-containing gas. The compositions thereof are shown in Table 3 below.

TABLE 3

| Gas component | mol % |
|---|---|
| $CH_4$ | 91.96 |
| $C_2H_6$ | 6.54 |
| $C_3H_8$ | 1.00 |
| $IC_4$ | 0.20 |
| $NC_4$ | 0.20 |
| $N_2$ | 0.10 |

Examples 1 to 3 and Comparative Examples 1 and 2

Iron ore particles (apparent density: 2.24 g/cm$^3$; average particle size: 106 to 180 μm) were used as a catalyst.

Pyrolysis of methane was carried out using a self-manufactured system as a rotary kiln reactor based on FIG. 2. The material of the tube in the rotary kiln reactor was INCONEL® ALLOY 601, and a heater made of FeCrAl alloy (Kanthal A1) was provided to the outer surface of the tube to supply heat necessary for pyrolysis. Each of a helix baffle and lifters provided to the tube in the rotary kiln reactor was made of INCONEL® ALLOY 601. In addition, a catalyst storage device, a feeder connected to the catalyst storage device, a discharge buffer tube, and a carbon storage device connected to the discharge buffer tube were provided, and the catalyst storage device and the carbon storage device were designed not to be affected by the internal pressure of the reactor for continuous operation.

Example 1

The conditions of methane pyrolysis performed in the rotary kiln reactor were set as shown in Table 4 below.

TABLE 4

| Classification | Pyrolysis conditions |
|---|---|
| Reaction temperature at the outer all of the reactor | 820° C. |
| Reaction pressure | 1.4 bar |
| Flow rate of methane in gaseous feedstock | 1.5 slm (standard liters per minute) |
| Supply speed of catalysts | 46.9 cc/hr |
| Rotational speed of kiln (tube) | 0.2 rpm |
| Inclination angle of kiln | 1° |

Figure 7:
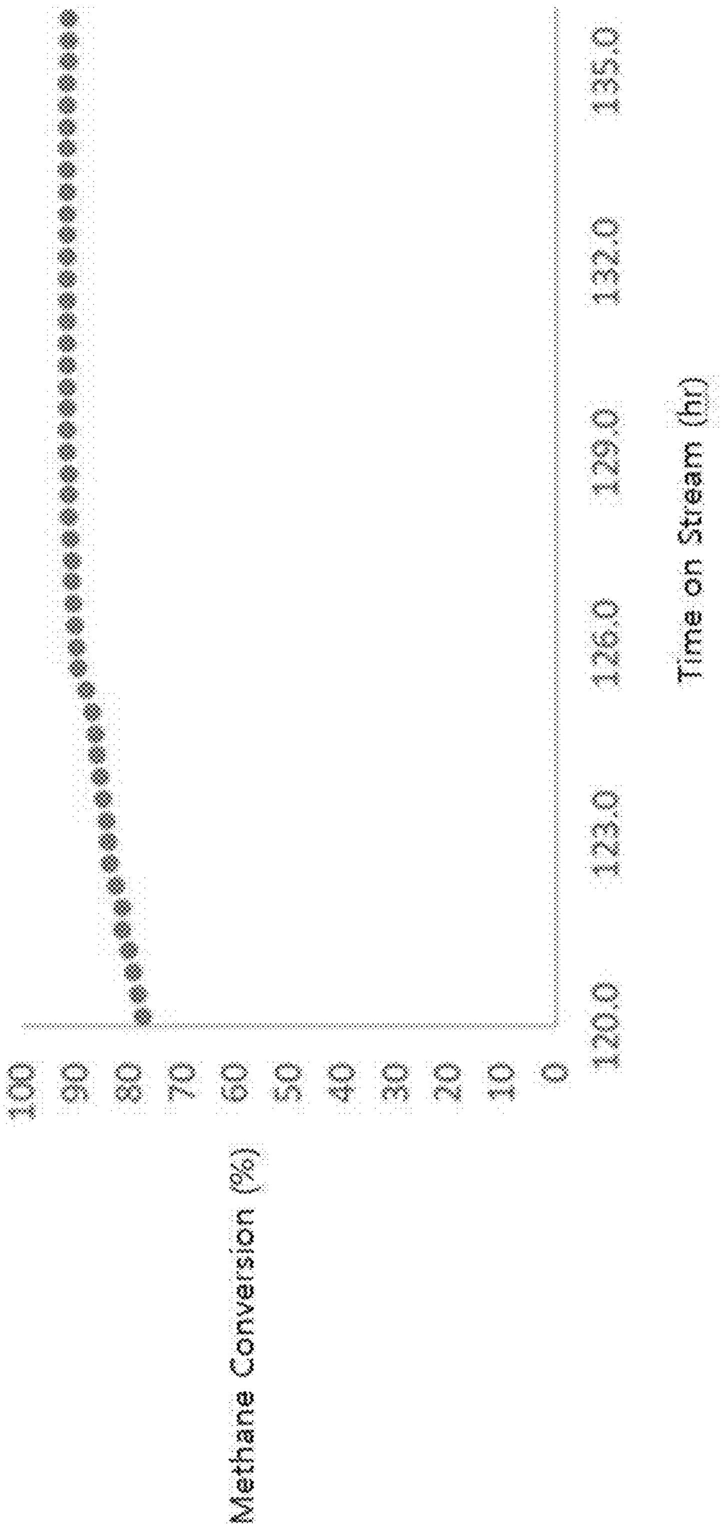
FIG. 7 is a graph showing methane conversion depending on TOS (time on stream) in Example 1.

The methane conversion as a function of the pyrolysis time (TOS, time on stream) was measured, and the results thereof are shown in FIG. 7.

Referring to FIG. 7, the maximum conversion of methane was determined to be 92% at the set reaction temperature and reaction pressure under the condition that the catalysts and methane were continuously injected. As such, no water was generated.

Example 2

The conditions of methane pyrolysis performed in the rotary kiln reactor were set as shown in Table 5 below.

TABLE 5

| Classification | Pyrolysis conditions |
|---|---|
| Reaction temperature at the outer all of the reactor | 820° C. |
| Reaction pressure | 1.4 bar |
| Flow rate of methane in gaseous feedstock | 3 slm |
| Supply speed of catalysts | 59.5 cc/hr |
| Rotational speed of kiln (tube) | 0.13 rpm |
| Inclination angle of kiln | 0.5° |

Figure 8:
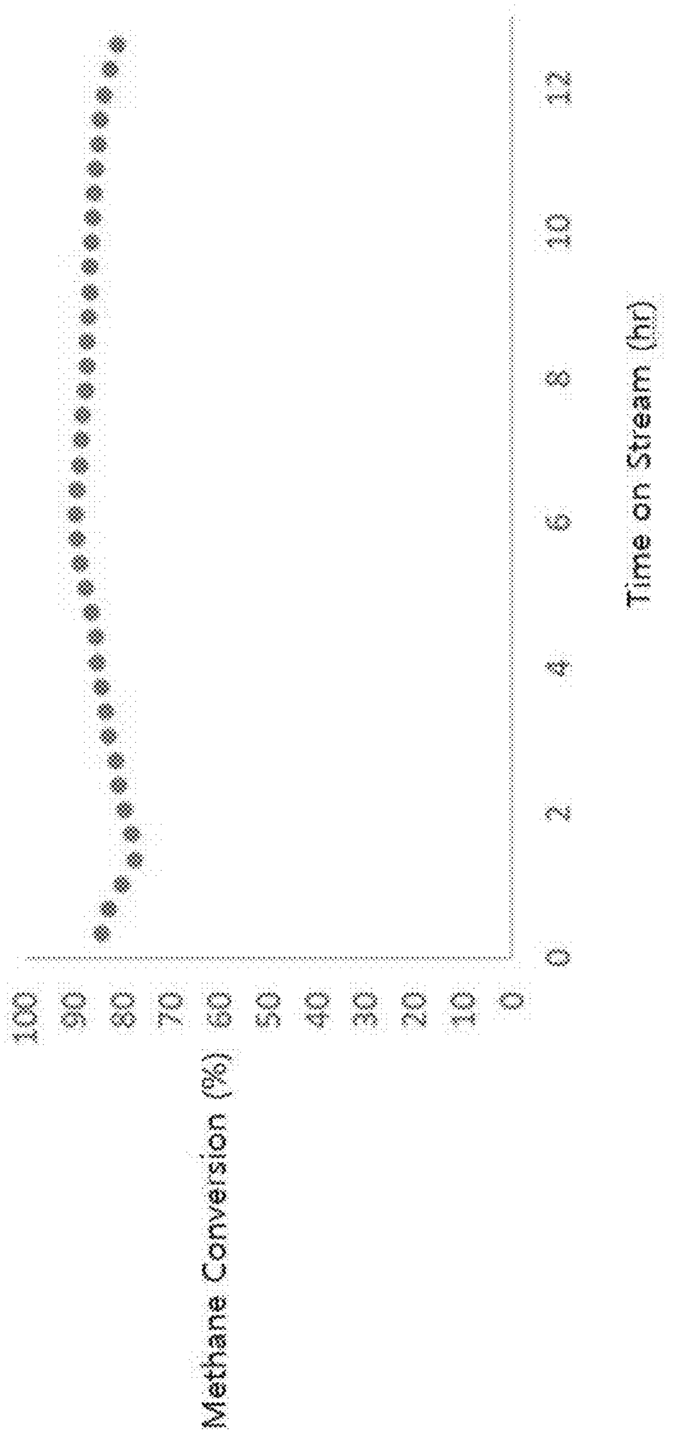
FIG. 8 is a graph showing methane conversion depending on TOS (time on stream) in Example 2.

The methane conversion as a function of time (TOS, time on stream) was measured, and the results thereof are shown in FIG. 8. Compared to Example 1, in Example 2, both the flow rate of methane and the supply speed of the catalysts increased, and the rotational speed of the rotary kiln was lowered, thereby achieving a maximum methane conversion of 89%.

Comparative Example 1

The conditions of methane pyrolysis performed in the rotary kiln reactor were set as shown in Table 6 below.

TABLE 6

| Classification | Pyrolysis conditions |
|---|---|
| Reaction temperature at the outer all of the reactor | 820° C. |
| Reaction pressure | 1.4 bar |
| Flow rate of methane in gaseous feedstock | 2 slm |
| Supply speed of catalysts | 43.8 cc/hr |
| Rotational speed of kiln (tube) | 0.11 rpm |
| Inclination angle of kiln | 0° |

Figure 9:
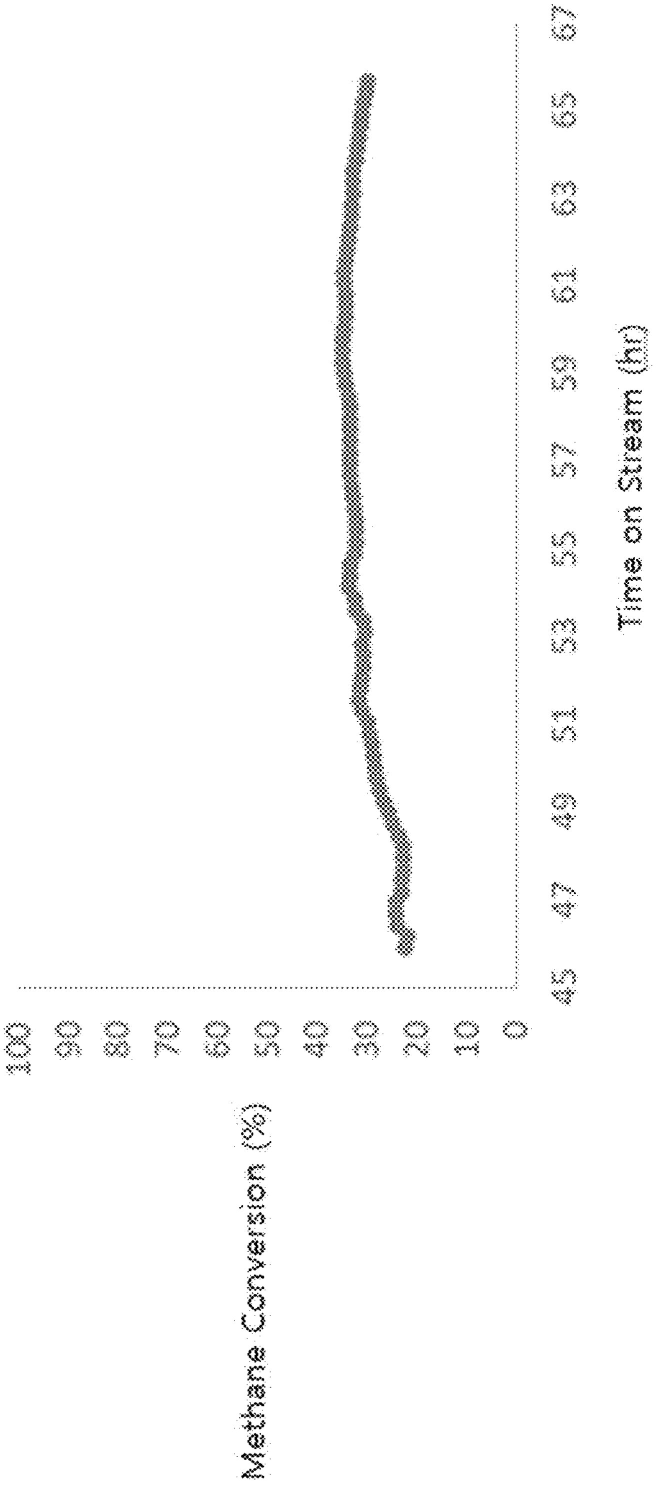
FIG. 9 is a graph showing methane conversion depending on TOS (time on stream) in Comparative Example 1.

The methane conversion as a function of time (TOS, time on stream) was measured, and the results thereof are shown in FIG. 9.

Referring to the drawing, the methane flow rate and the catalyst supply speed of Comparative Example 1 were set similarly to those of Example 1, but the rotational speed of the rotary kiln was low and the inclination angle of the kiln was not applied. Consequently, the maximum conversion of methane was 35%. This is supposed to be because contact between the solid catalysts and the gaseous feedstock is not efficient due to the low rotational speed of the kiln, and moreover because forward movement of the solid catalyst particles is not efficient due to the absence of the inclination angle of the kiln.

Comparative Example 2

The conditions of methane pyrolysis performed in the rotary kiln reactor were set as shown in Table 7 below.

TABLE 7

| Classification | Pyrolysis conditions |
|---|---|
| Reaction temperature at the outer all of the reactor | 800° C. |
| Reaction pressure | 1.2 bar |
| Flow rate of methane in gaseous feedstock | 1 slm |
| Supply speed of catalysts | 37.5 cc/hr |
| Rotational speed of kiln (tube) | 0.09 rpm |
| Inclination angle of kiln | 0° |

Figure 10:
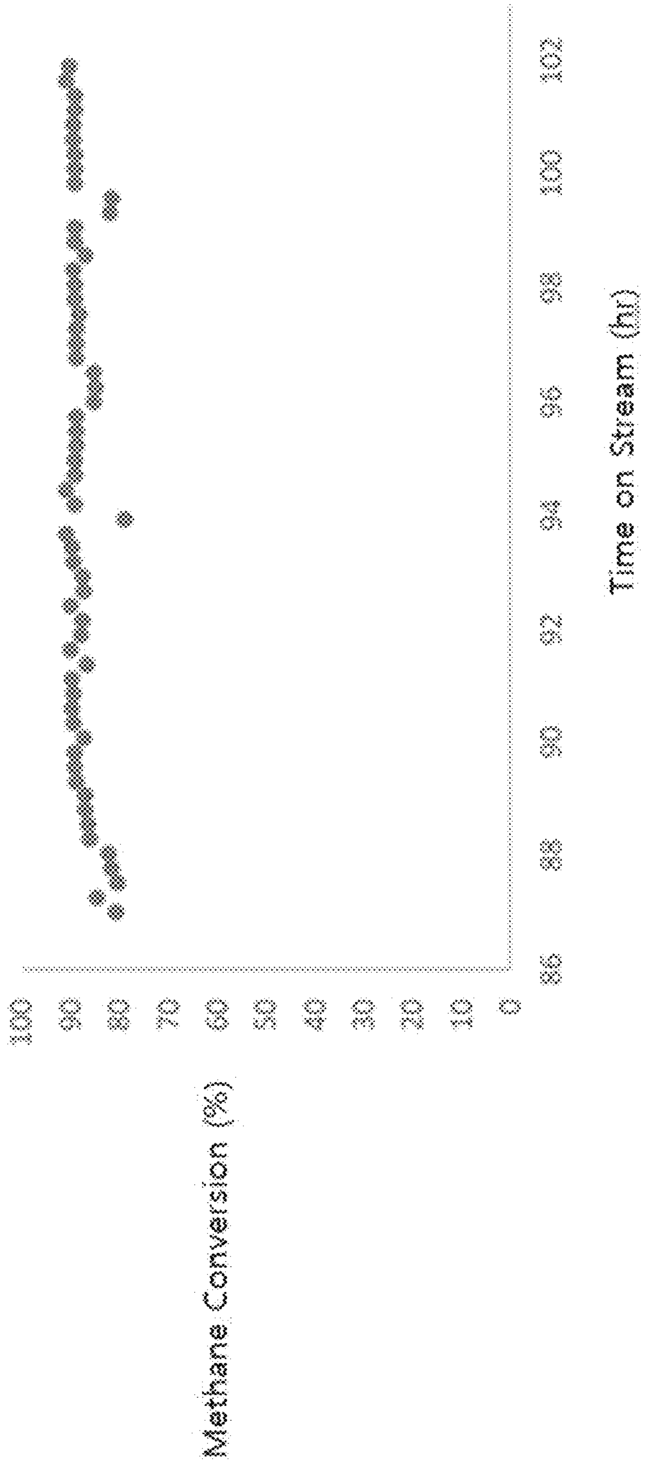
FIG. 10 is a graph showing methane conversion depending on TOS (time on stream) in Comparative Example 2.

The methane conversion as a function of time (TOS, time on stream) was measured, and the results thereof are shown in FIG. 10.

Referring to the drawing, the maximum average conversion of methane was determined to be 91%. Compared to Example 1, the reaction temperature and reaction pressure were relatively low, and the flow rate of methane and the supply speed of the catalysts were similar. Also, similarly to Comparative Example 1, the rotational speed of the kiln was low and the inclination angle of the kiln was not applied. Here, the methane conversion is determined to increase because the residence time of methane in the kiln is lengthened due to the low methane flow rate compared to Example 1.

Nevertheless, in view of productivity, the low methane flow rate and reaction pressure were applied and the methane conversion was similar to that of Example 2, but productivity was confirmed to be 3.5 times lower. Therefore, when the supply speed of the solid catalysts and the flow rate of methane as a reactant are increased proportionally and the rotational speed of the kiln and the inclination angle of the kiln are adjusted to remove an appropriate amount of carbon generated in the kiln, it is determined that hydrogen and carbon as a semi-finished product can be continuously produced from the methane-containing feedstock.

Example 3

Figure 11:
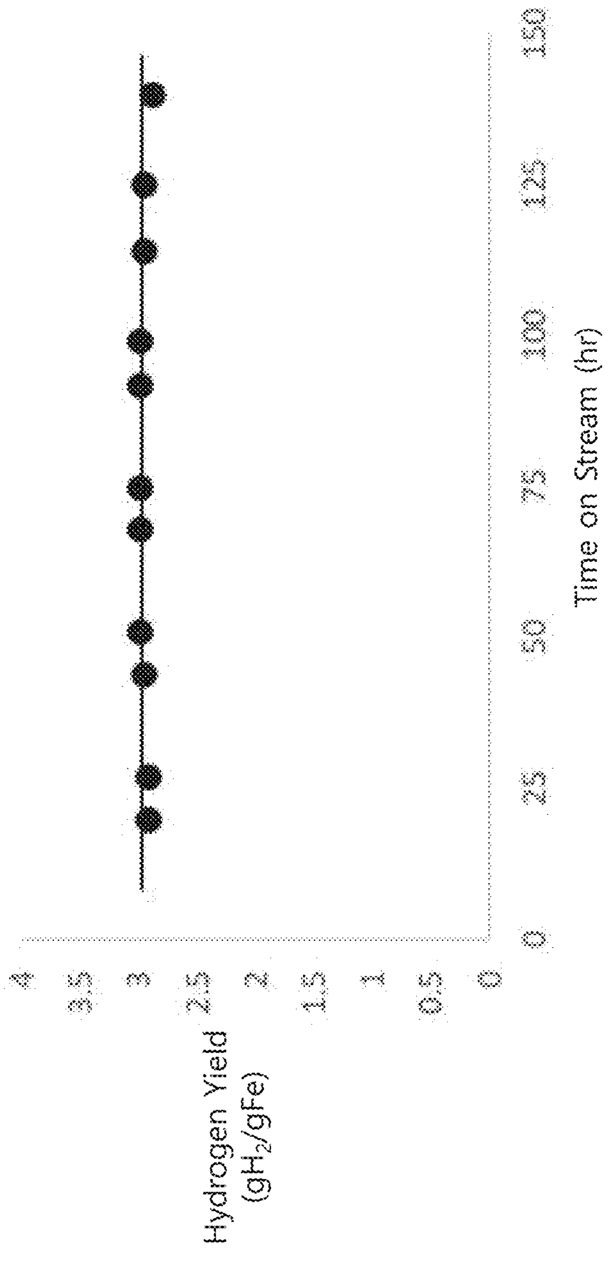
FIG. 11 is a graph showing hydrogen yield depending on TOS (time on stream) in Example 3.

When using the rotary kiln reactor of Example 1 or 2 and based on the conversion of 90% during pyrolysis, compositions of individual streams in the entire process shown in FIG. 1 are shown in Table 8 below (unit: ton), and also, the hydrogen yield with TOS (time on stream) is shown in FIG. 11.

TABLE 8

| Stream | Composition |
|---|---|
| Feedstock | $CH_4$: 14.9 |
| 1 | $CH_4$: 16 |
| 2 | $CH_4$: 16, iron ore: 1.72 |
| 3 | Iron ore: 1.72 |
| 4 | $CH_4$: 16, iron ore: 1.72 |
| 5 | $H_2/CH_4/CO$: 3.6/1.1/0.91 |
| 6 | $H_2/CH_4/CO$: 3.6/1.1/0.91 |
| 7 | $CH_4$: 1.1 |
| 8 | $H_2$: 3.6 |
| 9 | CO: 0.91 |
| 10 | $CH_4$: 1.1 |
| 11 | C/Fe: 10.8/1.2 |

The results of the table above were obtained by performing the process in a continuous mode using methane as the feedstock and iron ore as the catalyst on a hydrogen production scale of 1 ton per year. The above table shows the mass flow of hydrogen, carbon monoxide, and carbon produced according to the process flow when hydrogen is produced at a methane conversion of 90% in the presence of the catalyst.

Examples 4 to 6 and Comparative Examples 3 and 4

Figure 12:
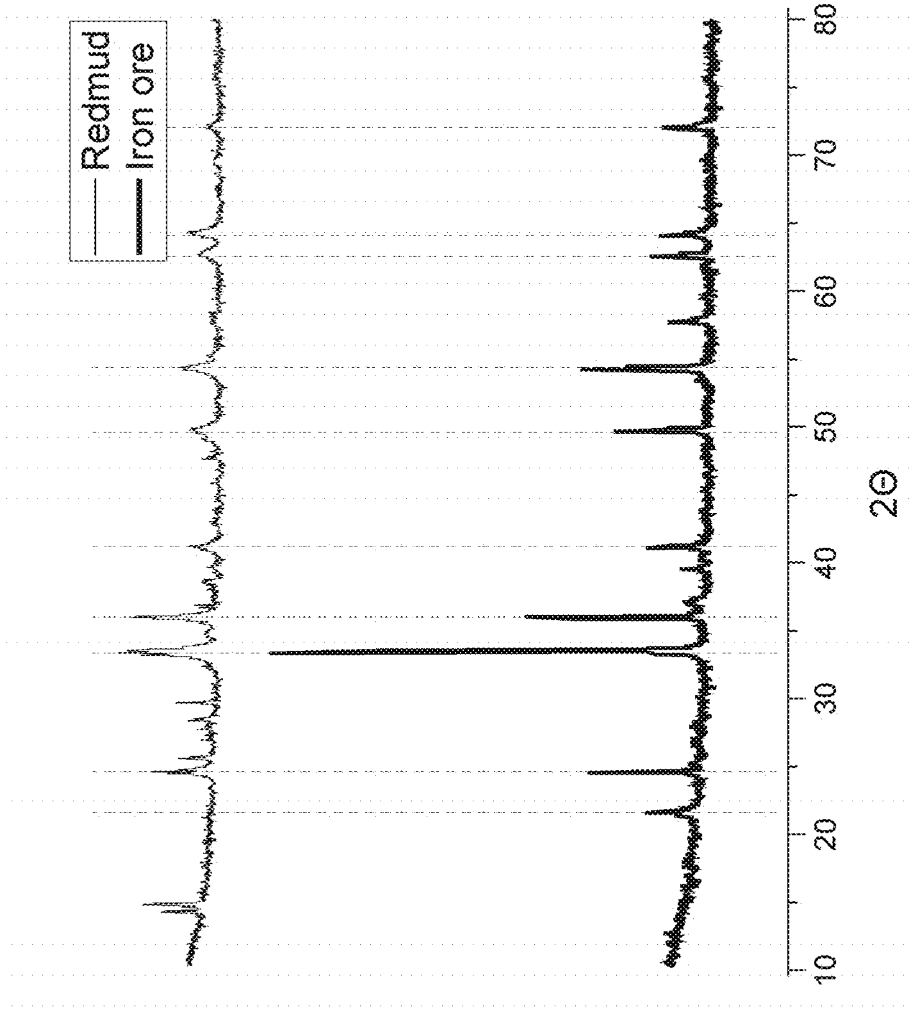
FIG. 12 shows the X-ray diffraction (XRD) patterns of red mud and iron ore, respectively.

Red mud particles having an apparent density of 1.04 g/cm$^3$ and an average particle size of about 106 to 300 μm were used as a catalyst. X-ray diffraction (XRD) analysis was performed on red mud, and also, the comparison results with iron ore (apparent density: 2.24 g/cm$^3$; average particle size: about 106 μm to 180 μm) are shown in FIG. 12. Referring to the drawing, for red mud, in addition to the characteristic peak corresponding to iron oxide, characteristic peaks corresponding to AlOOH, $TiO_2$, and $SiO_2$ were observed, indicating that aluminum (Al), silicon (Si), titanium (Ti), etc. are additionally contained.

Example 4

Figure 13:
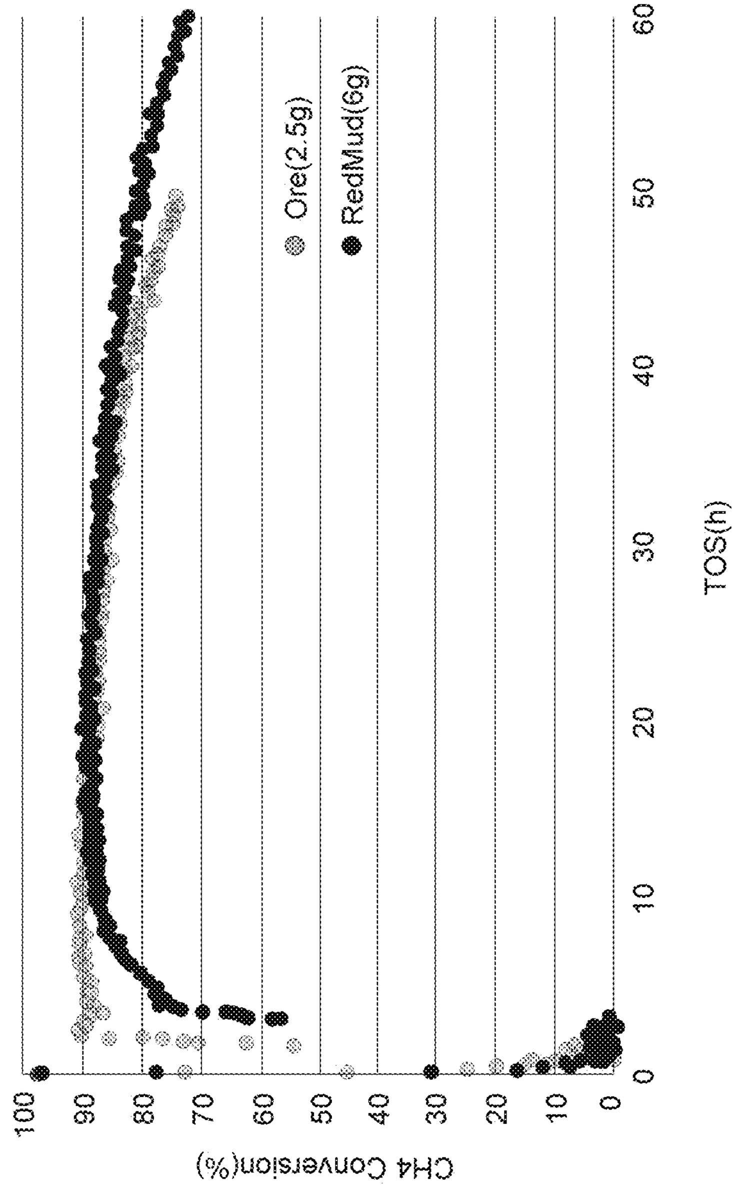
FIG. 13 is a graph showing methane conversion depending on TOS (time on stream) when performing methane pyrolysis reaction by use of red mud and iron ore, respectively, as catalysts, under the same experimental conditions based on the same iron content.

Pyrolysis of methane was carried out using a vertical reactor (volume: 56.4 cc; material: SUS316) under conditions shown in Table 9 below, and the amount of each of red mud (6 g) and iron ore (2.5 g) was adjusted so that the same amount of iron oxide was contained in the catalysts. During pyrolysis using the two catalysts, a methane conversion and hydrogen yield were measured, and the results thereof are shown in Table 9 below and FIG. 13.

TABLE 9

| Catalyst | Catalyst loading (g) | Temperature (° C.) | $CH_4$ flow (ccm) | $gH_2/gFe$ |
|---|---|---|---|---|
| Iron ore | 2.5 | 815 | 10 | 2.48 |
| Red mud | 6 | 815 | 10 | 2.81 |

Referring to the drawing, pyrolysis in the presence of the red mud catalyst showed a methane conversion with time similar to that when using the iron ore catalyst, which means that, even when red mud is used as the catalyst, the methane conversion is similar under the condition that the amount of iron, an active metal, is the same as in iron ore.

Example 5

Pyrolysis was carried out using red mud as a catalyst in the same rotary kiln reactor as in Example 1.

The conditions of methane pyrolysis carried out in the rotary kiln reactor were set as shown in Table 10 below.

TABLE 10

| Classification | Pyrolysis conditions |
|---|---|
| Reaction temperature at the outer all of the reactor | 820° C. |
| Reaction pressure | 1.4 bar |
| Flow rate of methane in gaseous feedstock | 1.5 slm |
| Supply speed of catalysts | 30 cc/hr |
| Rotational speed of kiln (tube) | 0.5 rpm |
| Inclination angle of kiln | 1° |

Figure 14:
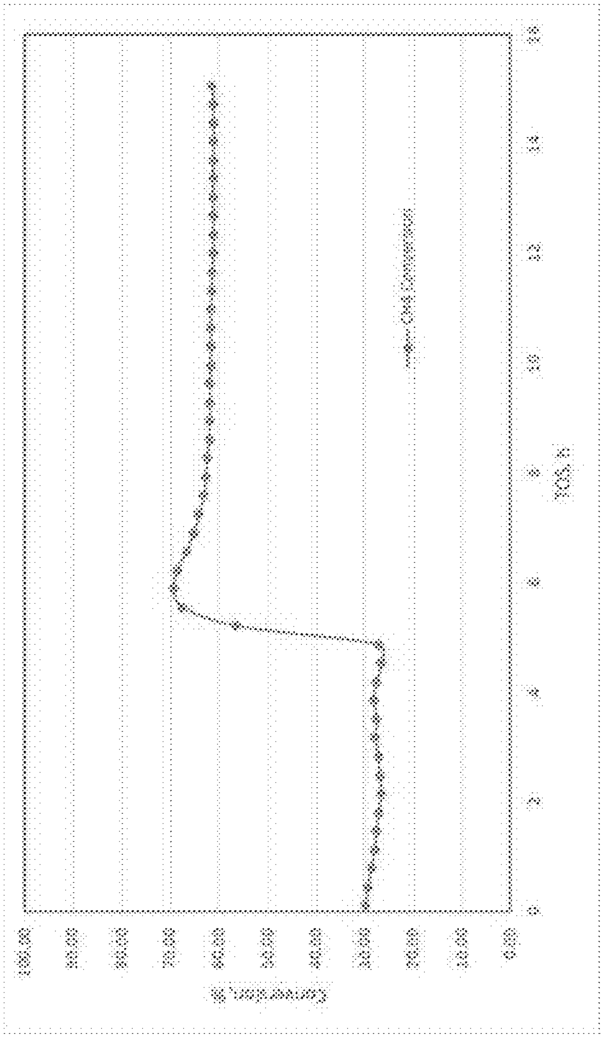
FIG. 14 is a graph showing methane conversion depending on TOS (time on stream) in Example 5.

The methane conversion as a function of time (TOS, time on stream) was measured, and the results thereof are shown in FIG. 14.

Referring to the drawing, the methane conversion was almost maintained at about 27.7% until about 5 hours at the set reaction temperature and reaction pressure under the condition that the catalysts and methane were continuously injected and at the supply speed of catalysts changed from 20 cc/hr to 30 cc/hr. However, after the catalysts reached the inside of the reactor and was uniformly injected, the maximum conversion of methane rapidly increased to 69.3% and was then maintained at about 60% or more.

Comparative Example 3

The conditions of methane pyrolysis carried out in the rotary kiln reactor were set as shown in Table 11 below.

TABLE 11

| Classification | Pyrolysis conditions |
|---|---|
| Reaction temperature at the outer all of the reactor | 820° C. |
| Reaction pressure | 1.4 bar |
| Flow rate of methane in gaseous feedstock | 2.0 slm |
| Supply speed of catalysts | 20 cc/hr |
| Rotational speed of kiln (tube) | 0.5 rpm |
| Inclination angle of kiln | 1° |

Figure 15:
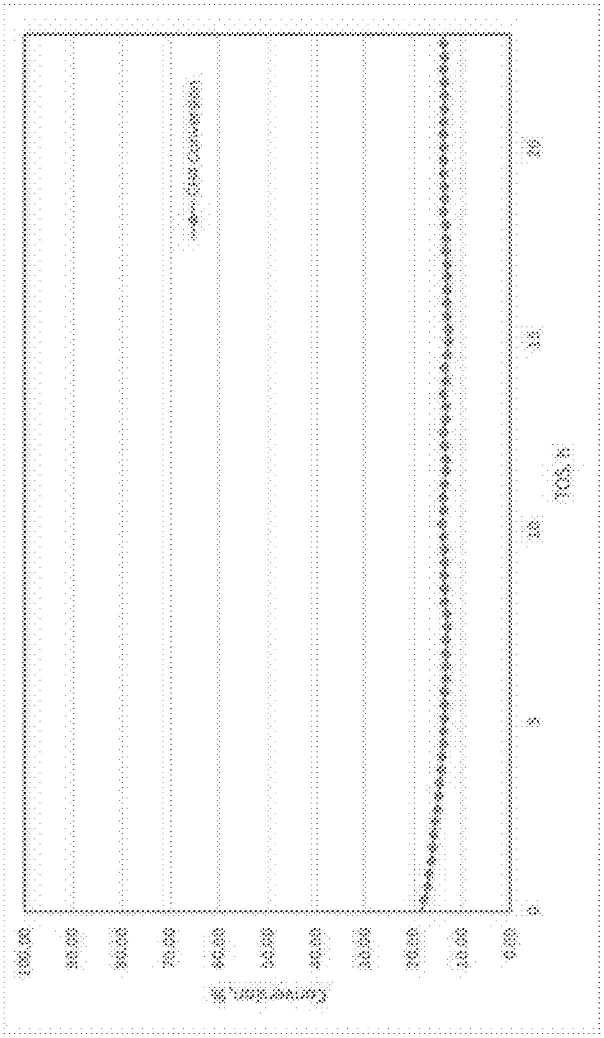
FIG. 15 is a graph showing methane conversion depending on TOS (time on stream) in Comparative Example 3.

The methane conversion as a function of time (TOS, time on stream) was measured, and the results thereof are shown in FIG. 15.

Referring to the drawing, the pyrolysis conditions in Comparative Example 3 were set differently from those of Example 5 in that the flow rate of methane in gaseous feedstock was 2.0 slm, which was 0.5 slm higher than that of Example 5, and the supply speed of the catalysts was 20 cc/hr, which was 10 cc/hr lower than that of Example 5. As a result, the maximum conversion of methane was 13.9%, and no improvement over time was observed. This is supposed to be because the amount of methane converted is small due to high flow rate of methane supplied compared to the amount of catalysts injected.

Comparative Example 4

Pyrolysis of methane was carried out in the same manner as in Example 5, with the exception that the conditions of methane pyrolysis in the rotary kiln reactor were set as shown in Table 12 below.

TABLE 12

| Classification | Pyrolysis conditions |
|---|---|
| Reaction temperature at the outer all of the reactor | 820° C. |
| Reaction pressure | 1.4 bar |
| Flow rate of methane in gaseous feedstock | 2.0 slm |
| Supply speed of catalysts | 30 cc/hr |
| Rotational speed of kiln (tube) | 0.5 rpm |
| Inclination angle of kiln | 1° |

Figure 16:
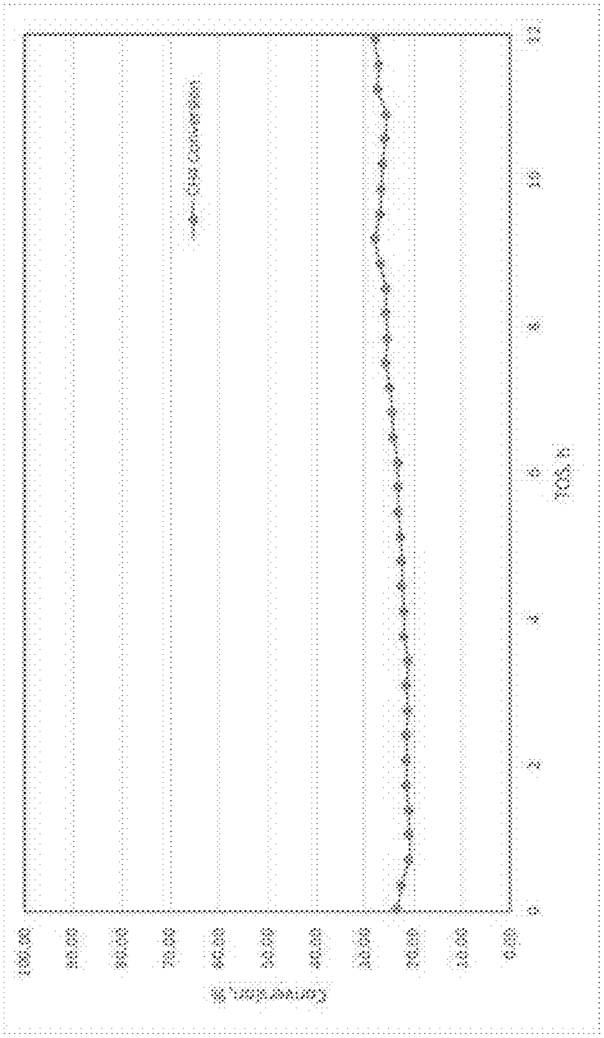
FIG. 16 is a graph showing methane conversion depending on TOS (time on stream) in Comparative Example 4.

The methane conversion as a function of time (TOS, time on stream) was measured, and the results thereof are shown in FIG. 16.

Referring to the drawing, the pyrolysis conditions in Comparative Example 4 were set differently from those of Example 5 in that the flow rate of methane in gaseous feedstock was 2.0 slm, which was 0.5 slm higher than that of Example 5. As a result, the maximum conversion of methane was 27.7%, and no improvement over time was observed. This is supposed to be because the amount of methane converted is small despite an increase in the amount of the catalysts injected due to high flow rate of methane supplied compared to the amount of catalysts injected as in Comparative Example 3.

Example 6

When using the rotary kiln reactor of Example 5 and based on the conversion of 60% during pyrolysis, compositions of individual streams in the entire process shown in FIG. 1 are shown in Table 13 below (unit: ton).

TABLE 13

| Stream | Composition |
|---|---|
| Feedstock | $CH_4$: 9.96 |
| 1 | $CH_4$: 16.6 |
| 2 | $CH_4$: 16.6, red mud: 3.06 |
| 3 | Red mud: 3.06 |
| 4 | $H_2$/$CH_4$/CO/carbon (C) in solid/iron (Fe) in red mud/material other than $Fe_2O_3$ in red mud: 2.49/6.64/0.60/7.21/0.80/1.92 |
| 5 | $H_2$/$CH_4$/CO: 2.49/6.64/0.60 |
| 6 | $H_2$/$CH_4$/CO: 2.49/6.64/0.60 |
| 7 | $CH_4$: 6.64 |
| 8 | $H_2$: 2.49 |
| 9 | CO: 0.60 |
| 10 | $CH_4$: 6.64 |
| 11 | Carbon (C) in solid/iron (Fe) in red mud/material other than $Fe_2O_3$ in red mud: 7.21/0.80/1.92 |

The results of the table above were obtained by performing the process in a continuous mode using methane as the feedstock and iron ore as the catalyst on a hydrogen production scale of 1 ton per year. The above table shows the mass flow of hydrogen, carbon monoxide, and carbon produced according to the process flow when hydrogen is produced at a methane conversion of 60% in the presence of the catalyst.

Consequently, oxygen present in iron ore or red mud was converted into carbon monoxide and removed, and activated iron reacted with methane and thus carbon was precipitated, removing the active metal iron and carbon as solids, while gaseous hydrogen, carbon monoxide, and unreacted methane were easily separated through a downstream separation process.

As is apparent from the above description, a process according to an embodiment of the present disclosure is capable of producing gas products comprising hydrogen and carbon monoxide, and solid products comprising carbon-based material (or carbon) by subjecting a gaseous methane-containing feedstock to pyrolysis (involving auto-thermal reduction of methane) in a rotary kiln-type reactor in the presence of an iron oxide-containing solid particle catalysts. In addition, the use of the rotary kiln-type reactor configured to easily control the residence time of the iron oxide-containing solid particle catalysts in the reactor and bring the catalysts into uniform contact with the gaseous methane-containing feedstock enables efficient operation not only in a batch mode but also in a continuous mode. In particular, since hydrogen yield is high in view of the nature of the reaction, it is advantageous for commercial production of hydrogen, which has recently been rapidly increasing in demand, and also, it is possible to produce carbon monoxide that can be used for various purposes, rather than greenhouse gases such as carbon dioxide.

Furthermore, carbon produced according to the present embodiment has properties suitable for electrodes of various energy storage devices such as lithium secondary batteries, especially anodic materials, advantageously preparing high value-added carbon materials, as well.

It should be understood that modifications and variations of the present disclosure may be made by those skilled in the art, and such modifications or variations should fall within the scope of the present disclosure.

What is claimed is:

1. A process for producing hydrogen ($H_2$), carbon monoxide (CO), and carbon (C) from methane, comprising:

a) forming pyrolysis products containing unreacted methane, carbon, hydrogen, and carbon monoxide by introducing a methane-containing feedstock and iron oxide-containing catalysts in the form of solid particles into a rotary kiln-type reactor;

b) separating a gas mixture containing the unreacted methane, the hydrogen, the carbon monoxide and an iron (Fe)-containing carbon-based solid from the pyrolysis products through gas-solid separation; and c) separating the gas mixture into unreacted methane, hydrogen and carbon monoxide, respectively, wherein the rotary kiln-type reactor comprises:

a tube configured to accommodate solid particles and gas and to be rotatable;

a heater configured to supply controlled heat to an inner space of the tube;

a helix baffle configured to extend along an inner circumferential surface of the tube to induce the introduced iron oxide-containing catalysts in the form of solid particles to move forward in a longitudinal direction of the tube according to rotation of the tube; and at least one lifter provided on the inner circumferential surface of the tube to disperse the introduced iron oxide-containing catalysts in the form of solid particles in the tube, wherein a helix angle of the helix baffle is adjusted to range from 30 to 60°.

2. The process of claim 1, wherein, in the gas mixture, a molar ratio of hydrogen ($H_2$)/carbon monoxide (CO) is adjusted to range from 20 to 70 and a molar ratio of hydrogen ($H_2$)/methane ($CH_4$) is adjusted to range from of 1 to 60.

3. The process of claim 1, wherein the methane-containing feedstock and the iron oxide-containing catalysts in the form of solid particles are introduced into the rotary kiln-type reactor in a co-current flow manner.

4. The process of claim 1, wherein lifters of up to 12 are provided per pitch of the helix baffle.

5. The process of claim 1, wherein the at least one lifter has at least one of a straight shape or a bent shape.

6. The process of claim 5, wherein the bent shape is a shape bent in an oblique line or a shape bent at a right angle.

7. The process of claim 1, wherein the iron oxide-containing catalysts are iron ore and/or red mud.

8. The process of claim 1, wherein, in the rotary kiln-type reactor, a rotational speed of the tube is adjusted to range from of 0.05 to 5 rpm and a residence time of the iron oxide-containing catalysts in the form of solid particles is adjusted to range from 1 to 150 hours.

9. The process of claim 8, wherein, in the rotary kiln-type reactor, a reaction temperature is adjusted to range from 600 to 1,000° C. and a reaction pressure is adjusted to range from 0.1 to 10 bar.

10. The process of claim 1, wherein a pitch length of the helix baffle ranges from 1/60 to 1/6 of a length of the tube.

11. The process of claim 1, wherein a height of the helix baffle is adjusted to range from 1/10 to 1/2 of an inner diameter of the tube, and a height of the lifter is adjusted to range from 1/10 to 1/2 of the inner diameter of the tube.

12. The process of claim 1, wherein a ratio of a length of the tube to an inner diameter of the tube (L/D) is set to range from 5 to 50.

13. The process of claim 1, wherein an angle of repose of the iron (Fe)-containing carbon-based solid is at least 10°.

14. The process of claim 1, wherein the carbon in the pyrolysis products is graphitic carbon.

15. The process of claim 1, wherein an inclination angle of the rotary kiln-type reactor is adjusted to range from 0.01 to 10° on a horizontal basis.

16. The process of claim 1, wherein, at beginning of step a), methane and the iron oxide-containing catalysts are introduced in a co-current manner into the reactor, and the iron oxide-containing catalysts are activated to form carbon monoxide and metallic Fe through a pretreatment section at a temperature adjusted to range from 600 to 800° C.

17. A process for producing hydrogen ($H_2$), carbon monoxide (CO), and carbon (C) from methane, comprising:

a) forming pyrolysis products containing unreacted methane, carbon, hydrogen, and carbon monoxide by introducing a methane-containing feedstock and iron oxide-containing catalysts in the form of solid particles into a rotary kiln-type reactor;

b) separating a gas mixture containing the unreacted methane, the hydrogen, the carbon monoxide and an iron (Fe)-containing carbon-based solid from the pyrolysis products through gas-solid separation; and c) separating the gas mixture into unreacted methane, hydrogen and carbon monoxide, respectively, wherein the iron oxide-containing catalysts in the form of solid particles have an apparent density ranging from 0.7 to 2.8 g/cm$^3$, and the iron (Fe)-containing carbon-based solid has an apparent density ranging from 0.05 to 1.5 g/cm$^3$.

18. A process for producing hydrogen ($H_2$), carbon monoxide (CO), and carbon (C) from methane, comprising:

a) forming pyrolysis products containing unreacted methane, carbon, hydrogen, and carbon monoxide by introducing a methane-containing feedstock and iron oxide-containing catalysts in the form of solid particles into a rotary kiln-type reactor;

b) separating a gas mixture containing the unreacted methane, the hydrogen, the carbon monoxide and an iron (Fe)-containing carbon-based solid from the pyrolysis products through gas-solid separation; and c) separating the gas mixture into unreacted methane, hydrogen and carbon monoxide, respectively, wherein a molar ratio of carbon (C)/iron (Fe) in the iron (Fe)-containing carbon-based solid (based on a methane conversion of 50 to 90%) is set to range from 25 to 60.

* * * * *